United States Patent [19]

Russell et al.

[11] Patent Number: 5,629,626
[45] Date of Patent: May 13, 1997

[54] APPARATUS AND METHOD FOR MEASURING BURIED FERROMAGNETIC OBJECTS WITH A HIGH ACCURACY OF POSITION AND IN SYNCHRONIZATION WITH A SYNC PULSE PROVIDED BY A GLOBAL POSITIONING SYSTEM

[75] Inventors: Richard J. Russell, Chelmsford; Alan L. Crandall, Lunenburg; Robert M. Siegel, West Newton; John E. Foley, Lowell; Thomas A. Glenn, Reading, all of Mass.; Thomas J. Gorman, Middletown, R.I.

[73] Assignee: Geo-Centers, Inc., Newton Centre, Mass.

[21] Appl. No.: 273,600

[22] Filed: Jul. 12, 1994

[51] Int. Cl.$^6$ .................... G01V 3/08; G01V 3/00
[52] U.S. Cl. .................... 324/345; 324/226; 342/357
[58] Field of Search .................... 324/226, 67, 345, 324/326–331; 364/424.01, 420, 433, 444, 449, 460; 367/19; 342/357

[56] References Cited

U.S. PATENT DOCUMENTS

| | | | |
|---|---|---|---|
| 4,686,474 | 8/1987 | Olsen et al. | 324/331 |
| 4,727,329 | 2/1988 | Behr | 324/345 |
| 4,814,711 | 3/1989 | Olsen et al. | 324/331 |
| 5,319,374 | 6/1994 | Desai et al. | 342/387 |

OTHER PUBLICATIONS

Geo–Centers, Inc., "Final Technical Report Remote Detection Of Unexploded Ordnance—Surface Towed Ordnance Locator System (STOLS)," Feb. 1991.

Primary Examiner—Sandra L. O'Shea
Assistant Examiner—Jay M. Patidar
Attorney, Agent, or Firm—Wolf, Greenfield & Sacks P.C.

[57] ABSTRACT

Apparatus and method for collecting magnetometer data at the earth's surface in order to detect anomalies in the earth's magnetic field caused by buried ferromagnetic objects. A plurality of magnetometers are provided in a predetermined array on a mobile platform. A fixed station is also provided on the earth's surface, and navigational data from a global positioning system (GPS) is collected on the locations of the fixed station and mobile platform in synchronization with a sync signal received from the GPS. While the mobile platform traverses an area on the earth's surface, magnetometer data is collected in synchronization with the sync signal. The apparatus and method provide a significant improvement in the amount of area which can be surveyed in a given time period and in the precision of the location and magnetic field intensity data collected.

30 Claims, 32 Drawing Sheets

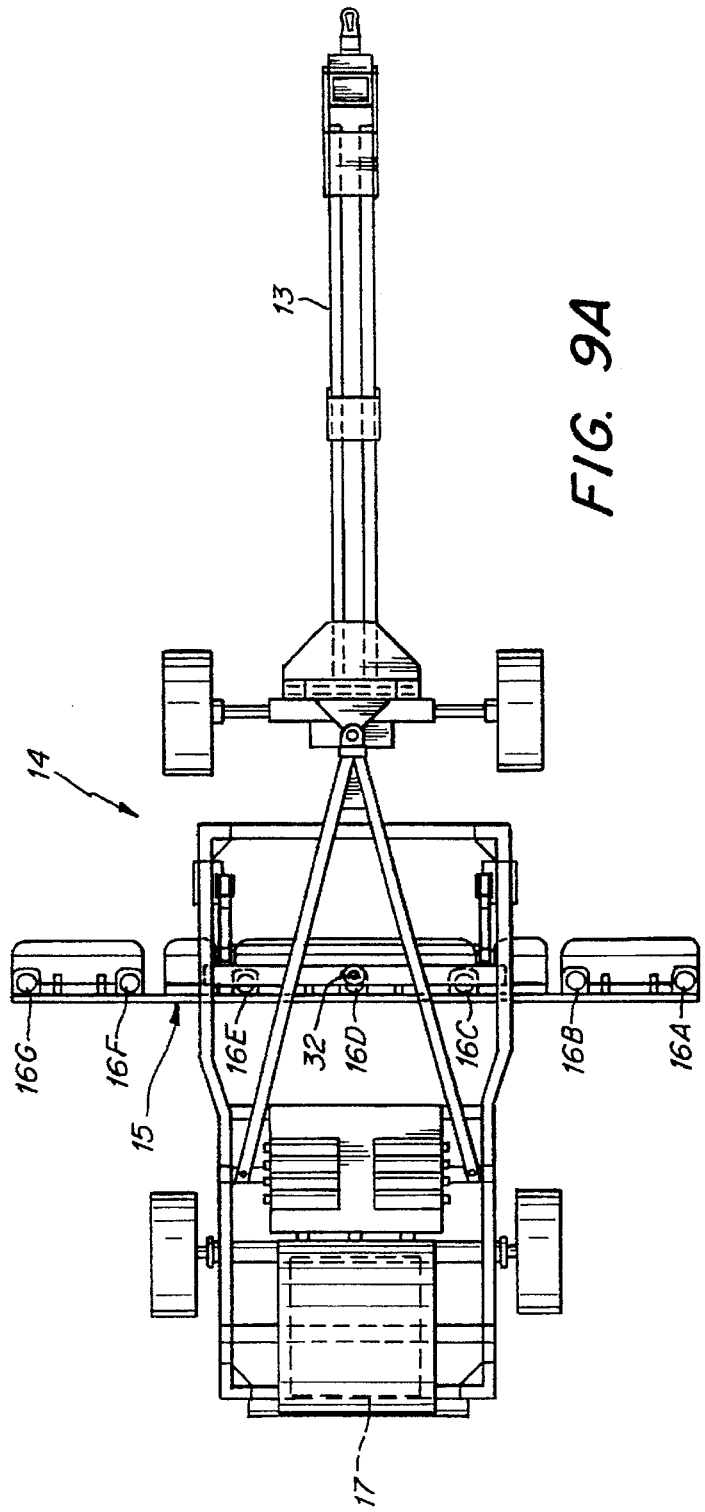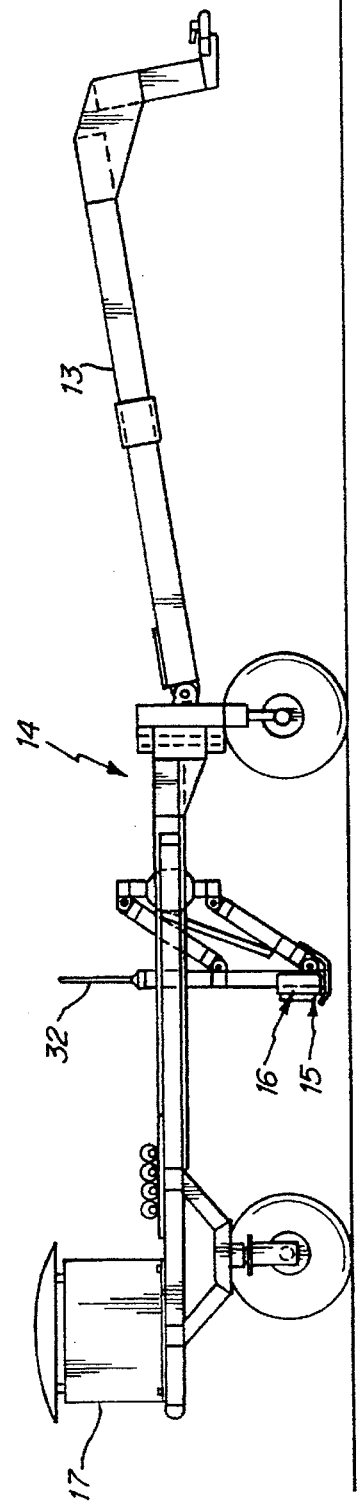

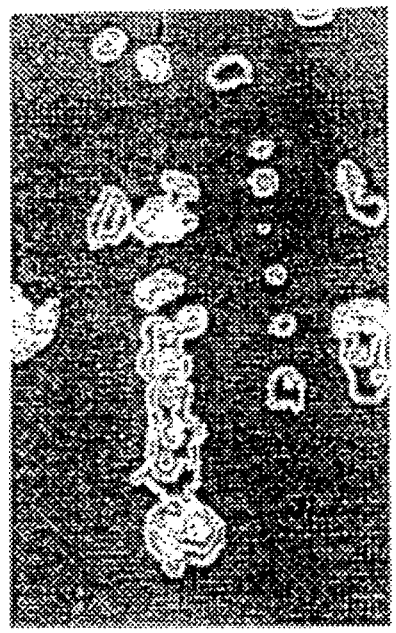
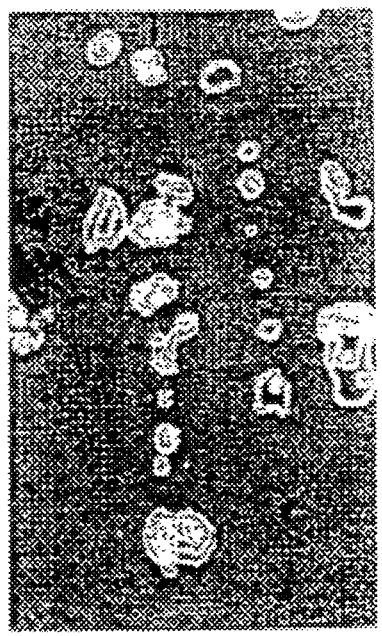
FIG. 12A    FIG. 12B
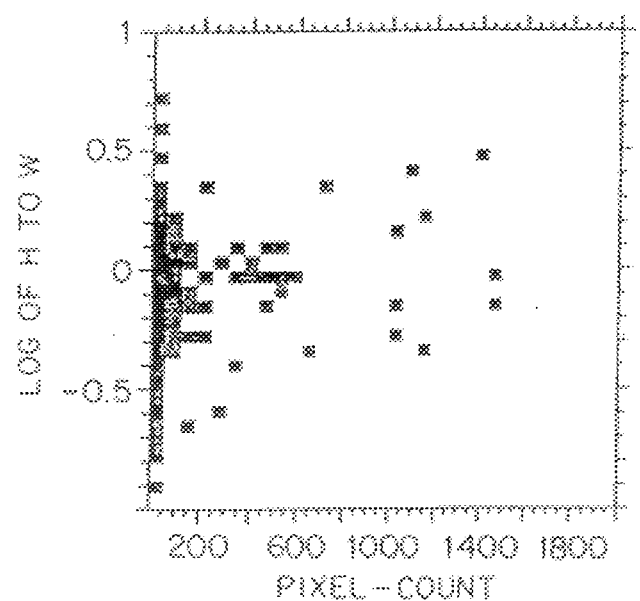
FIG. 12C

|  |  |  |  |
|---|---|---|---|
| =SURVEY= | =STATUS= | | MAGDAQ /307 |
| 301—LAT: | 4217.573195,N | | INITIALIZE: DONE |
| 302—LON: | 07112.108937,W | | INTERRUPT: DONE |
| 303—ALT: | 53.60,M | | STATUS: 24(HEX) |
| 304—GPS TIME: | 00:15:29 | | SAMPLES/SEC: 20 |
| | | | FIFO OVERRUN: 0 |
| | MAG1 MAG2 | MAG1 MAG2 | ONE SEC: 0 |
| 305— 0: | 12345 12345 | 10: 12345 12345 | SERIAL PORT /308 |
| 1: | 12345 12345 | 11: 12345 12345 | STATUS: 62(HEX) |
| 2: | 12345 12345 | 12: 12345 12345 | INDEX: 0 |
| 3: | 12345 12345 | 13: 12345 12345 | |
| 4: | 12345 12345 | 14: 12345 12345 | PROGRAM /309 |
| 5: | 12345 12345 | 15: 12345 12345 | ELAPSED TIME: 5 |
| 6: | 12345 12345 | 16: 12345 12345 | STATUS: TERMINATED- |
| 7: | 12345 12345 | 17: 12345 12345 | ERROR: NONE |
| 8: | 12345 12345 | 18: 12345 12345 | |
| 9: | 12345 12345 | 19: 12345 12345 | |
| 306—DATA FILE: X | | | |

FIG. 30

APPARATUS AND METHOD FOR MEASURING BURIED FERROMAGNETIC OBJECTS WITH A HIGH ACCURACY OF POSITION AND IN SYNCHRONIZATION WITH A SYNC PULSE PROVIDED BY A GLOBAL POSITIONING SYSTEM

FIELD OF THE INVENTION

The present invention is directed to a system for detecting buried ferromagnetic objects, wherein magnetometer data is collected from an array of magnetometers on a movable platform in synchronization with the collection of navigational data from a global positioning system (GPS). The apparatus may be implemented as a rugged all-terrain motorized vehicle and tow platform or as a portable manually-operable harness or wheeled assembly.

BACKGROUND OF THE INVENTION

The characterization and remediation of lands contaminated with hazardous, toxic and radiological waste (HTRW), or with unexploded ordnance, poses enormous technological and operational challenges. The Department of Energy and Department of Defense each control millions of acres of potentially contaminated land. Some of these areas are contaminated and well-characterized, some are contaminated but uncharacterized, and others are merely suspect. Of those either contaminated or suspect, they range from bounded areas of several acres to unbounded areas of many hundreds of square miles.

Aerial photography may be used to survey these lands, but provides only inferential data. Most investigators use either hand-held or highly localized vehicle-mounted sensors. The data produced by these prior systems are then subjectively interpreted by an operator or processed off-line at a high cost of both time and money. In general, these methods are slow, labor-intensive and correspondingly expensive to deploy. It is an object of the present invention to overcome the problems with these prior surveying systems.

SUMMARY OF THE INVENTION

The present invention is a ground-based, non-intrusive, highly mobile system capable of effectively and efficiently characterizing large areas in a short time, at a reduced unit cost, and with good precision.

The present invention uses passive geophysical techniques to detect anomalies (changes) in the earth's ambient magnetic field caused by buried ferromagnetic objects. In particular, many environmental characterization problems can be solved by addressing the correlated problem of finding hazardous material barrels or containers, which predominantly contain ferromagnetic materials, such as iron and steel. These materials induce an observable secondary magnetic field which can be measured and modelled to yield estimates of location, depth and mass of the ferromagnetic object. In addition to waste containers, unexploded ordnance are ferromagnetic and induce an observable change in the earth's magnetic field.

The passive measurement technique of the present invention has several advantages over other geophysical techniques for environmental applications:

no positioning of an external source is required, i.e., the source (buried ferromagnetic object) is always active;
  data can be collected while the sensors (magnetometers) are moving;
  comparatively low data volume; and
  comparatively minimal data processing.

In a first embodiment, a motorized vehicle pulls a towed sensor platform containing an array of total-field magnetometers whose position is determined via differential GPS navigation technology. The acquired data is processed to produce high-resolution magnetic image maps of the surveyed area. The magnetometers may be cesium vapor, optically pumped, total field magnetometers, which produce a variable frequency proportional to the magnetic field strength. The earth's ambient magnetic field (at a clean site) is measured and recorded as a function of time, and subtracted from the data via post processing. The vehicle and tow platform are constructed so as to have a minimal magnetic signature.

In order to accurately and repeatedly position each data point, the data acquisition cycle is tied to a time standard used by the GPS navigation system which generates a stable and accurate 1 Hz output pulse (sync signal) coincident with the center point of the GPS epoch window (first time period) during which the navigational data is collected. The sync signal is received both by an antenna on the tow platform and a second GPS antenna at a fixed reference station on the earth's surface near the survey site. Thus, the position of the GPS antenna (on the tow platform adjacent the magnetometers) is known, at a 1 Hz rate, and is precisely synchronized with the collection of magnetometer data. Data from, for example, seven magnetometers spaced 0.5 m apart is acquired at a 20 Hz rate, and a linear interpolation used for sub-1 Hz positioning. The 20 Hz data relies on a 22.4 mph (10.0 m/s) maximum vehicle velocity to insure that the longitudinal sample spacing does not exceed a fixed transverse sampling spacing of 0.5 m.

The tow platform carries a sensor control computer which performs several low-level functions. A multi-channel frequency counter is used to record magnetometer data and a 16-channel analog-to-digital converter monitors power levels, sensor current levels, and sensor platform orientation (pitch and roll). The sensor platform heading can be monitored by an onboard compass. A 1 Hz data packet containing all data is created and sent to a second computer on the motorized vehicle, the main control computer.

The main control computer on the vehicle receives the 1 Hz data packet from the tow platform sensor computer, as well as ASCII II position data (from the fixed station) via a GPS receiver on the tow vehicle, and operator input. A Windows™ application program displays various types of information for the operator (i.e., driver of the vehicle), monitors the validity of all data, and informs the operator if a problem occurs. All data are saved on both internal memory and removable hard disks.

In a second embodiment, a manually operable sensor platform is provided comprising a maneuverable harness or wheeled assembly. The portable assembly includes a GPS antenna for receiving the sync signal and navigational data, an array of magnetometers, an interface for collecting the magnetometer data, and a hardware and software data processing and display system for pre-processing, displaying and storing the synchronized navigational and magnetometer data. Optionally, a micro-navigation system (e.g., accelerometer, inclinometer, height sensor) may be provided to insure proper positioning of the sensors and warn the operator that he is moving eratically and collecting bad data. Again, the platform is designed to have a low-magnetic signature. Additional design considerations for the portable system include the physical constraints imposed upon the system with respect to weight and power consumption due to portable deployment.

The portable system is used to acquire magnetometer data in areas not reachable by the vehicular system, such as regions with prohibitively rough topography, and/or land with trees or heavy underbrush.

These and other benefits and features of the present invention will be more fully described in the following detailed description.

BRIEF DESCRIPTION OF THE DRAWINGS

FIG. 9. Top (9A) and side (9B) views of the tow platform of FIG. 4.

FIG. 12. Plotted magnetic anomaly image segmented into regions with statistical similarities (12A, top left); attributes for each segment and empirical feature space correlations are determined; the image at top right (12B) shows segments which cluster; the image at bottom (12C) is a graph of pixel-count vs. log (height/width).

FIG. 30. Operator display screen showing an output in the DIAGNOSTIC mode.

DETAILED DESCRIPTION

Figure 1:
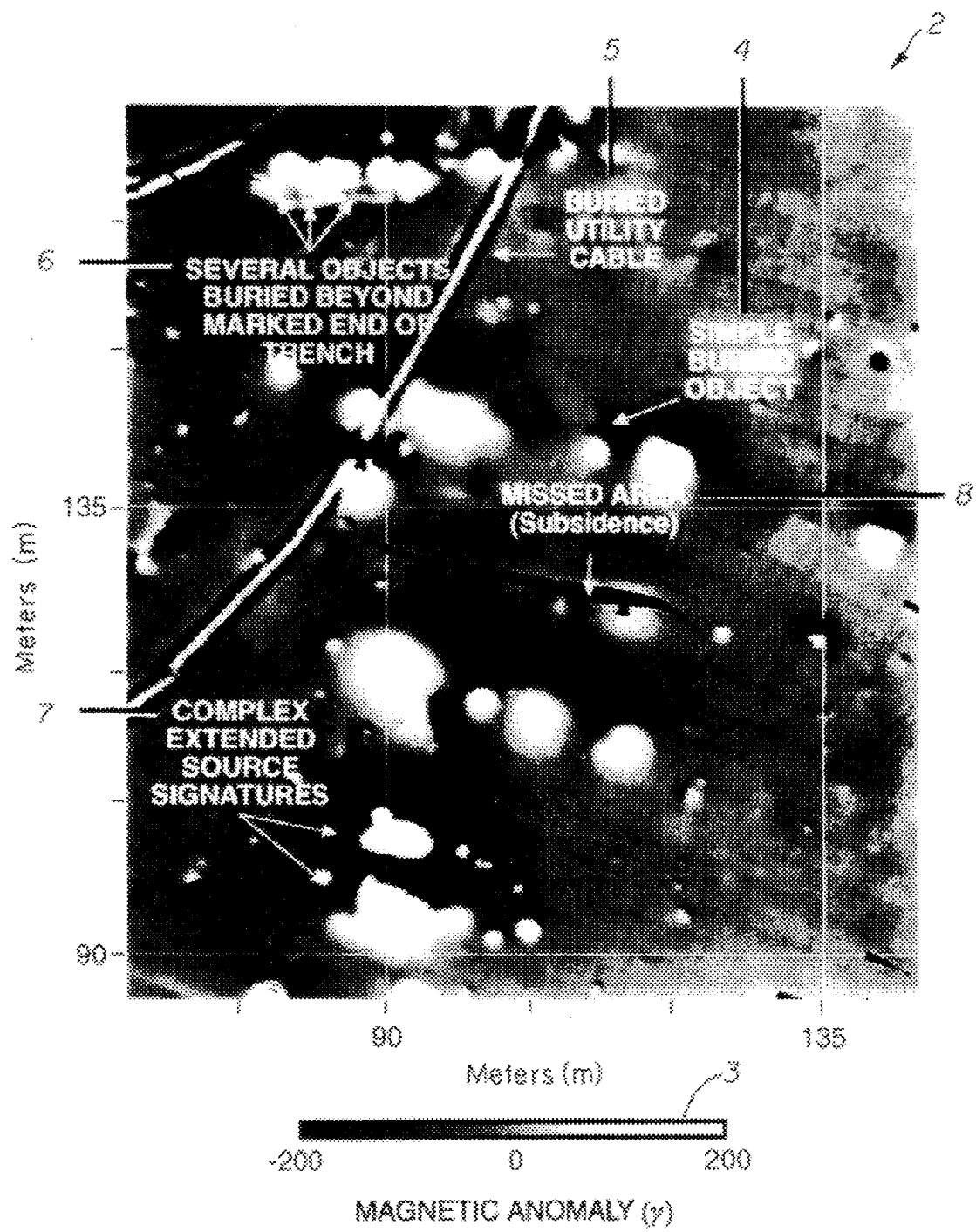
FIG. 1. Plotted survey data showing several types of magnetic signatures ranging from simple isolated anomalies to complex extended sources.

For ease of reference, this specification is divided into the following subsections:

1. Background
   1a. Magnetic Anomaly Source Representations
   1b. Detection of Burried Ferromagnetic Objects
2. Vehicle-Based System
   2a. Overview
   2b. Magnetometers
   2c. Data Acquisition
   2d. Vehicle/Platform
   2e. Navigation
   2f. Reference Magnetometer
   2g. Data Processing, Image Processing and Data Analysis
   2h. Field Examples
3. Data Acquisition Hardware
4. Data Acquisition Software
   4.1 Overview
   4.2 Survey State
   4.3 Landmark State
   4.4 Diagnostic State
   4.5 Playback State
   4.6 Data Transfer State
5. Data Processing Software
6. Magnetometer Interface
7. Portable System
   7.1 Overview
   7.2 Computer Control System
   7.3 Macro-Navigation System
   7.4 Micro-Navigation System
   7.5 Sensor Platform 1. Background Materials composed of ferromagnetic minerals, such as iron and steel, have elevated bulk susceptibilities which alter the Earth's magnetic field. Variations in the magnetic field can be measured at the earth's surface and modelled to determine the relative distribution of ferromagnetic materials below the surface.

Derivation of the governing equations for magnetic forces are analogous to those for gravitational forces, and can be obtained from Coulomb's law of magnetic poles (Telford, W. M., Sheriff, R. E., and D. A. Keys, "Applied Geophysics," Cambridge University Press, New York, 1982). A vector magnetic force, F(r), can be derived from a scalar potential $$F(r) = -\nabla A(r) \quad (1)$$

where A(r) is defined as the work required to move a magnetic pole against a magnetic field:

$$A(r) = \int F(r) \cdot dr \quad (2)$$

$$A(r) = m/\mu r_1 \quad (3)$$

where m is the strength of an isolated pole, $\mu$ is the magnetic permeability, and r is the distance to the pole. In practice magnetic poles exist as pairs, or dipoles. For a magnetic dipole, with equal and opposite poles separated by length L, the potential at some distance becomes $$A = (m/\mu_1 r_1) - (m/\mu_2 r_2) \quad (4)$$

$$A = m \left\{ \frac{1}{\sqrt{(r^2 + L^2 - 2rL\cos\theta)}} - \frac{1}{\sqrt{(r^2 + L^2 + 2rL\cos\theta)}} \right\} \quad (5)$$

and when r>>1, $$A \sim (2\,mL\cos\theta)/r_2 \quad (6)$$

The vector forces derived from this potential become $$F_r = -dA/dr$$

$$F_\theta = -dA/(rd\theta) \quad (7)$$

If we define M as the magnetic moment of the dipole then $$F_r = (2M\cos(\theta)dA)/r^3$$

$$F_\theta = (M\sin(\theta))/r^3 \quad (8)$$

and the total field strength at distance r becomes $$F_t = (M/r^3)\sqrt{(4\cos^2(\theta) + \sin^2(\theta))} \quad (9)$$

where $F_t$ is the induced magnetic field, or secondary field, generated by a ferromagnetic object in the presence of the Earth's primary field. The total field strength decays as the inverse cube of distance. The secondary field adds vectorially to the Earth's field and can be isolated if the Earth's field strength is known and subtracted from the magnetometer data. Since the Earth's field varies with spatial and temporal frequencies much lower than that of the anomalies of interest, the isolation of the signature of the anomaly is easily accomplished as discussed below.

1a. Magnetic Anomaly Source Representations

Magnetic modelling techniques range in complexity from simple methods utilizing a point-dipole source assumption (McFee, J. E. and Y. Das, "Determination Of The Parameters Of A Dipole By Measurement Of Its Magnetic Field," IEEE Trans. on Antennae Propagation, AP-29:282–287, 1981), to sophisticated finite difference numerical models of Maxwell's Equations (Hensel, E., and K. Dalton, "Nonintrusive Characterization of Waste Sites, In The Proceedings Of The International Topical Meeting On Nuclear And Hazardous Waste," Spectrum 1992, Boise, Id., August 1992). The appropriateness of the point-dipole magnetic field modelling technique is controlled by two factors. First, when the source-to-sensor distance is large with respect to the source size, then the magnetometer senses the object as a point source. In this case the sensor is in the far field, source morphology is not discernable, and the point-dipole source approximation is valid. Second, if the object is small and compact, then the near-field signature is similar to that of a point-dipole. Compact ferrous objects, such as some classes of buried ordnance, can be approximated as point-dipoles. Extended objects, such as buried pipes or complex shaped objects observed in the near-field, cannot be modelled with a point dipole.

FIG. 1 shows a survey image map 2 which contains several types of magnetic anomaly signatures, and an accompanying gray scale 3 for establishing the difference in intensity. A simple dipolar object 4 is shown, a buried utility cable 5, several objects buried beyond the end of a trench 6, several complex extended signatures 7 in the foreground, and a missed area (subsidence) 8 near the center.

Estimations of the near-field response of complex shaped objects can be made using a finite difference approximation to Cartesian based scalar Helmholtz equations:

$$\partial^2 H/\partial x^2 + \partial^2 H/\partial y^2 + \partial^2 H/\partial z^2 - \zeta H_x = 0$$

$$\partial^2 H/\partial x^2 + \partial^2 H/\partial y^2 + \partial^2 H/\partial z^2 - \zeta H_y = 0$$

$$\partial^2 H/\partial x^2 + \partial^2 H/\partial y^2 + \partial^2 H/\partial z^2 - \zeta H_z = 0 \quad (10)$$

where H is the magnetic field intensity and $\zeta$ is a propagation constant. Through this technique the media can be discretized into voxels representing arbitrary magnetic permeability. This approach is taken by Hensel, E., and K. Dalton, "Nonintrusive Characterization of Waste Sites, In The Proceedings Of The International Topical Meeting On Nuclear And Hazardous Waste," Spectrum 1992, Boise, Id., August 1992, and is effective for modelling the detailed signatures of arbitrary shaped objects in the near and far fields. This technique is more difficult to implement for routine processing due to the high computational demands of the finite difference technique, but can be used to characterize extended objects more effectively than with point-dipole based models.

1b. Detection of Burried Ferromagnetic Objects

There are two important aspects to magnetic anomaly detection: first, the sensor must record a signal of sufficient strength relative to background noise to detect the anomaly, and second, the data sampling density must be sufficient to allow for a coherent representation of the anomaly signature.

Figure 2:
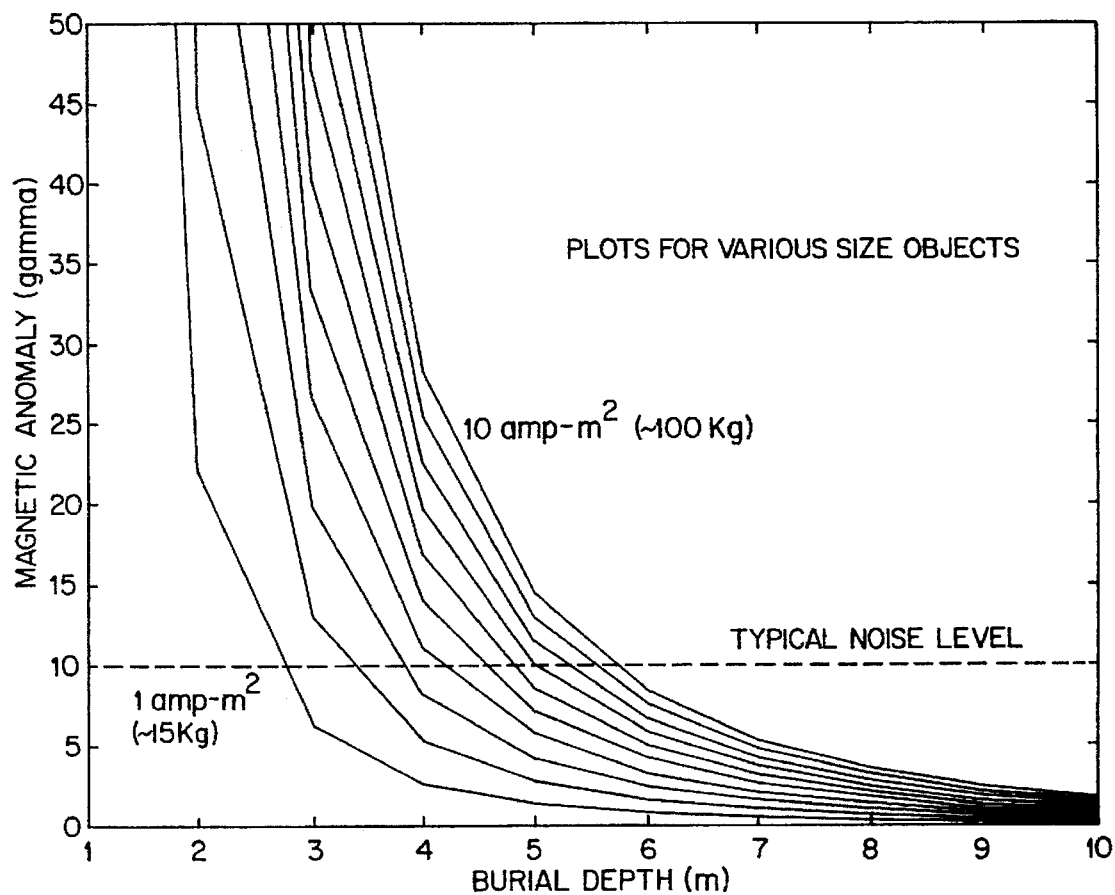
FIG. 2. Graph of magnetic anomaly versus burial depth showing magnetic anomaly decay curves for objects with moments ranging from 10 amp-m$^2$ (~100 Kg) to 1 amp-M$^2$ (~15 Kg).

The strength of the point-dipole (measured in amp-m$^2$) can be related to-the ferrous mass of the underground object via empirical modelling (Hersay, J. and Pennella, J., "Ordnance Locator Techniques—An Overview;" NAVEODFAC Technical Report TR-188, 1978). Through this relationship, the peak anomaly at a range of burial depths caused by an object containing various levels of ferrous mass can be calculated (see FIG. 2). Typical noise levels in magnetically clean areas are approximately 10$\gamma$. This chart shows that a 10$\gamma$ anomaly (signal to noise ratio=SNR=1) will be observed on surface sensors from a 100 Kg object at a depth of about 5.8 m. Elevating the sensors or increasing the depth of the object has an equivalent effect on the observation. Clearly, for the detestion of small objects (less than 15 kg), ground-based magnetometer platforms are required. FIG. 2 is an idealized detection scheme, and actual detection capabilities are dependent on several additional factors including object orientation, magnetic permeability of the ferrous object, and background noise levels.

Figure 3:
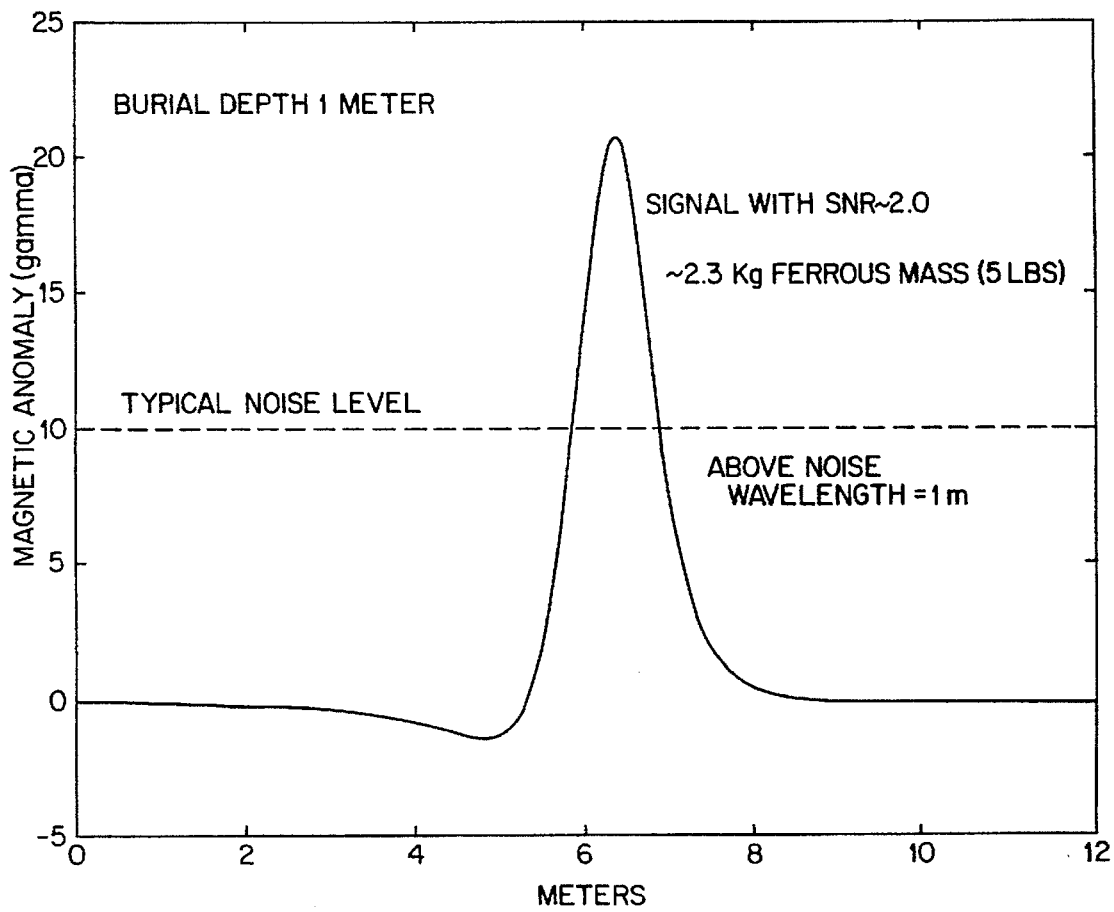
FIG. 3. Graph showing magnetic anomaly profile of an object with mass ~2.3 Kg; the peak signal from the object is 20 gamma, twice the typical noise level; the spatial extent of the signature from the object, above the 10 gamma level, is 1 m, which defines a sensor spacing of 0.5 meters.

In addition to the source-to-sensor distance, the shape and strength of the anomaly dictates the data density required to detect a target object. FIG. 3 shows an anomaly from an object with a mass of approximately 2.3 Kg having a peak of 20γ, twice the typical background noise level, and a spatial wavelength of 1 m. In order to detect this object, a sensor spacing of 0.5 m is preferred. Required data spacing is calculated in this manner and defines the predetermined spacing between magnetometers on the sensor platform (in this case 0.5 m apart). The sensor spacing also determines the maximum speed of travel of the sensor platform for a required precision, as discussed below.

2. Vehicle-Based System

2a. Overview

Figure 4:
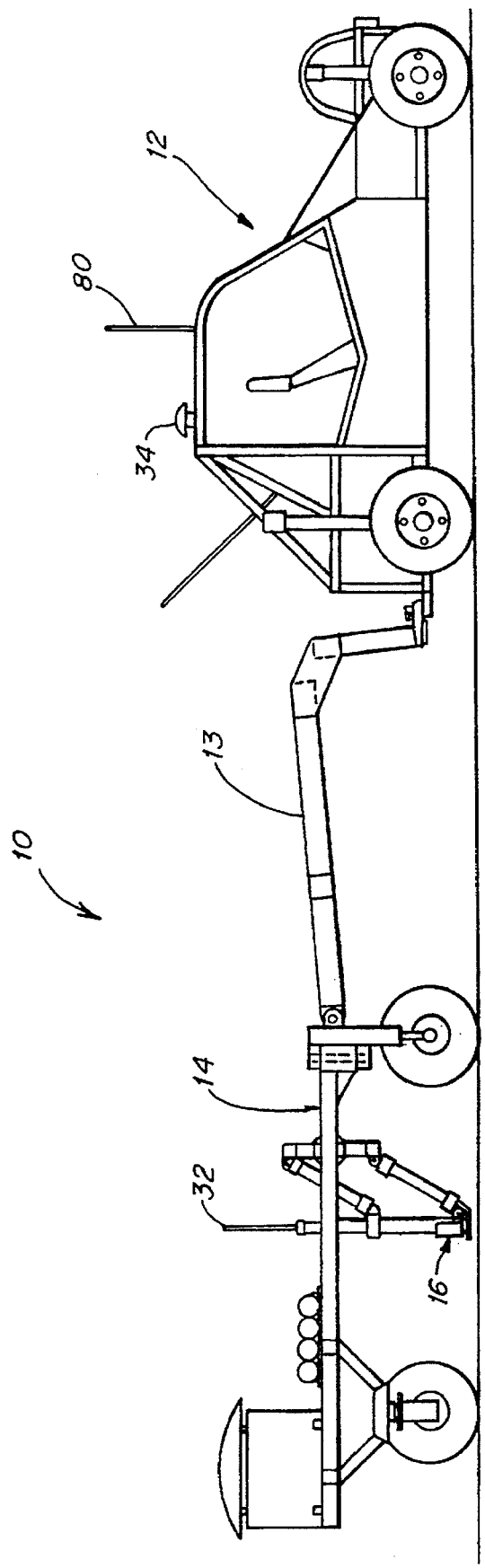
FIG. 4. Schematic side view of a vehicle-based system of this invention with motorized vehicle and towed sensor platform containing seven total-field magnetometers and precise satellite DGPS navigation for positioning of sensor data.

The vehicle-based system 10 (FIG. 4) includes a motorized vehicle 12 and a towed sensor platform 14 containing an array of total-field magnetometers and GPS antenna 32 for acquiring navigational data and synchronizing the collection of magnetometer data. The acquired data sets are processed to produce high-resolution magnetic image maps of the surveyed area.

Magnetic image maps of the surveyed area may be analyzed on a Unix workstation (not shown). For example, the user may select an anomaly and perform an automated iterative least-squares model match to determine the best fit of magnetic moment and depth to the selected anomaly. The resulting output yields an estimate of the dipole strength (empirically related to mass), depth and the location in the survey area. A target report listing all such targets in a given survey is then issued, as well as a map showing all target locations in the surveyed area.

The various sub-systems of the vehicle-based system will now be described.

2b. Magnetometers

The tow platform carries a linear array of seven cesium vapor, optically-pumped total field magnetometers 16A–G (e.g., Geometrics 822 magnetometers). These sensors produce a variable frequency proportional to the magnetic field strength by measuring the energy change associated with the transferring of electrons from one energy state to another. The Larmor frequency produced is directly proportional to the magnetic field at a rate of 3.5 Hz per γ (1γ=10e−5 gauss), or about 175 KHz for a nominal field of 50,000γ. The range of sensitivity in the system is approximately 10e−5 to insure 0.5γ resolution.

Total field sensors cannot differentiate between primary or secondary magnetic fields or the direction of the field. As such, they produce a measurement of the vector sum of all magnetic sources. To isolate the effects of the anomalous buried objects from all other effects two steps are required: first, the Earth's ambient magnetic field is measured and subtracted from the data via post processing, and second, the hardware is constructed such that it has a minimal magnetic signature at the sensors.

2c. Data Acquisition

Figure 5:
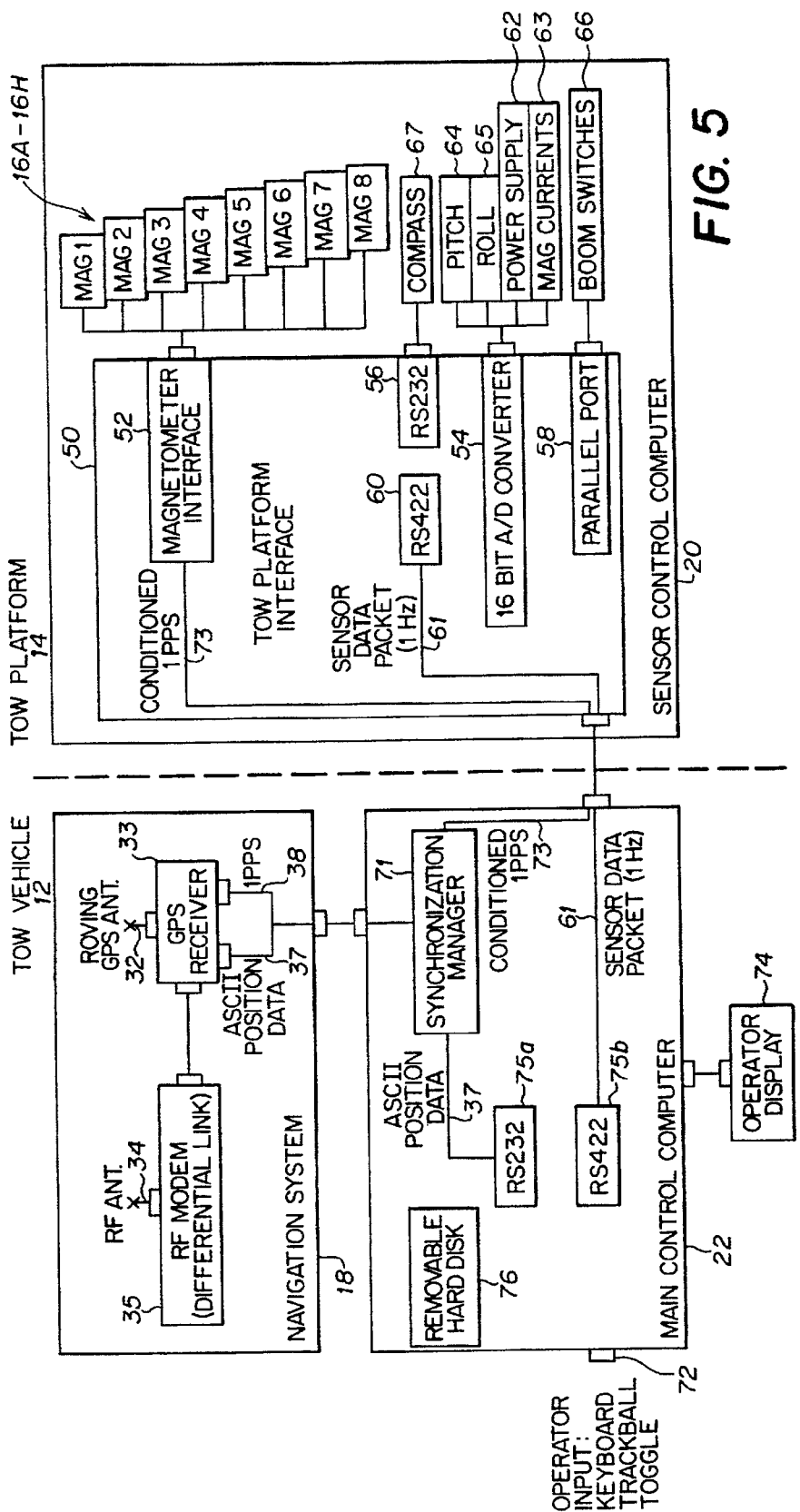
FIG. 5. Functional block diagram showing three main components of the data acquisition system: the navigation system, the sensor control computer, and the main control computer.

FIG. 5 is a functional block diagram of the data acquisition system. There are three main components: navigation system 18, sensor control computer 20 and main control computer 22.

Navigation: In order to accurately and repeatably position each data point, the data acquisition cycle (FIG. 6) is tied to the time standard used by the GPS navigation system which generates a stable and accurate 1 Hz output sync pulse (S1, S2, S3, S4 . . . ) coincident with the center point of the GPS epoch window. Thus, the navigational data (ND1, ND2 . . . ) is collected during a first time period centered around the sync pulse (S1, S2 . . . ); collection of the corresponding magnetometer data (MD1, MD2 . . . ) begins at the corresponding sync pulse, continues for a second time period, and ends before the start of the next navigation collection period. Data from the seven magnetometers are acquired at a 20 Hz rate, and a linear interpolation used for sub-1 Hz positioning. The 20 Hz data rate is based on a 22.4 mph (10.0 m/s) maximum vehicle velocity, and insures that longitudinal sample spacing does not exceed the fixed transverse sampling spacing between magnetometers of 0.5 m.

Sensor Control Computer: The sensor control computer 50 on tow platform 14 is a ruggedized PC which performs several low-level functions (see FIG. 5). A magnetometer interface 52 receives a conditioned GPS sync pulse 73 for synchronizing the recordal of data from magnetometers 16A–H. A 16-channel analog-to-digital converter 54 monitors power levels (62), sensor current levels (163) and sensor platform orientation (pitch 64 and roll 65). Additionally, the sensor platform heading is read from a fluxgate compass 63 via interface RS232 (56), and mechanical platform position indicators (switches 66 on the boom carrying the sensors) are read in via parallel port 58. A 1 Hz data packet 61 containing all data is created and sent to the main control computer via interface RS422 (60).

Main Control Computer: A second ruggedized PC located on tow vehicle 12 is used as the main control computer 22. A Windows™ application program receives the 1 Hz data packet 61 from the sensor computer 50, ASCII navigational data 37 from the DGPS receiver 33, and operator input via keyboard, trackball or toggle switches 72. A synchronization manager 71 receives the ASCII position data 37 via an RS232 interface 75a, and sends a conditioned 1 PPS sync signal 73 to magnetometer interface 52. Software in the main control computer displays various types of information for the operator on display 74, monitors the validity of all data, and informs the operator if problems occur (e.g., bad data or malfunction of equipment). All data is saved on internal memory (not shown), as well as on removable hard disks 76.

2d. Vehicle/Platform

The vehicle 12 and tow platform 14 (FIGS. 7–9) are designed to minimize magnetic self-signature and maximize offroad mobility. The use of non-magnetic materials including high-strength aluminum, bronze, and titanium reduces magnetic self-signature, while large clearances and independent gas spring/shock suspension substantially improve offroad mobility. The net result is a system that can travel at speeds in excess of 20 mph over rough terrain without adversely impacting the quality of data collected.

Tow Vehicle: The tow vehicle 12 (FIG. 7) is an offroad 2-wheel drive, single-passenger vehicle with a minimum of 14" clearance and 12" shock travel. The vehicle is driven by a 55 hp Volkswagen™ engine 82 that has been modified to provide for low-speed, high-torque operation. The drive train has been modified to provide high torque at low speeds and low idle. The chassis, body, wheels and transmission casing are made of aluminum, and the engine block is made of aluminum/magnesium alloy to reduce the vehicle's magnetic signature. The total ferrous mass has been minimized as much as possible, including limiting the choice of transmission gears to first, second, and reverse.

Figure 7A:
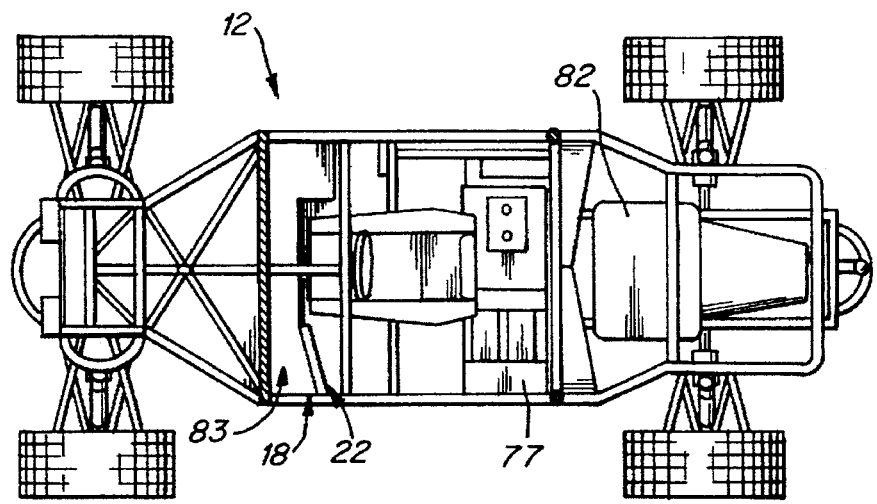
FIG. 7. Top (7A), front (7B) and side (7C) views of the vehicle of FIG. 4, with interior cutaway in FIG. 7C.
Figure 7B:
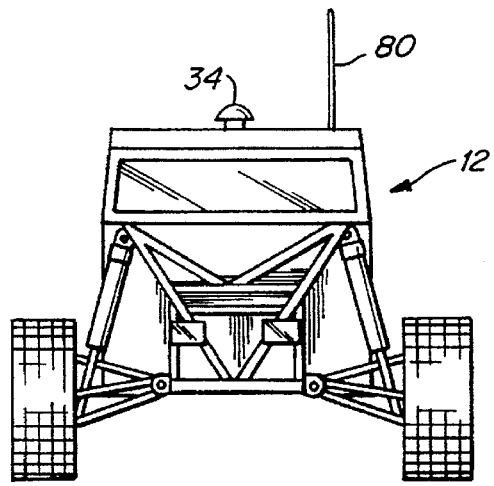
Figure 7C:
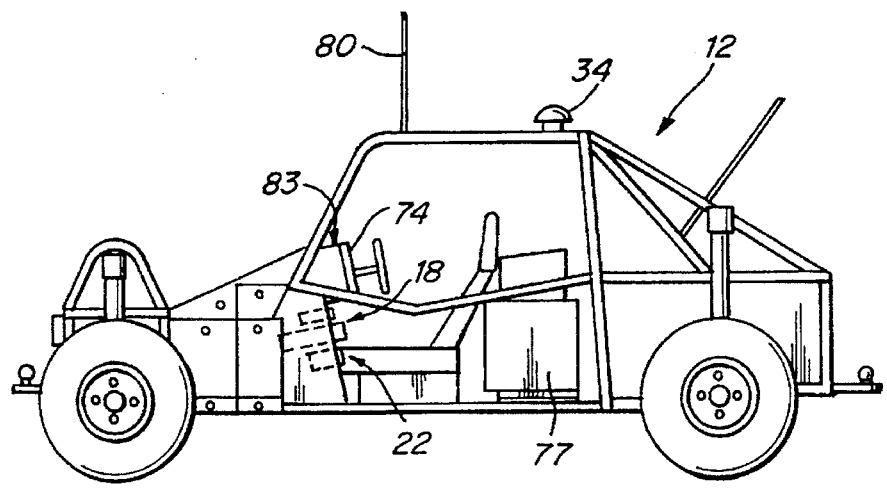
Figure 8A:
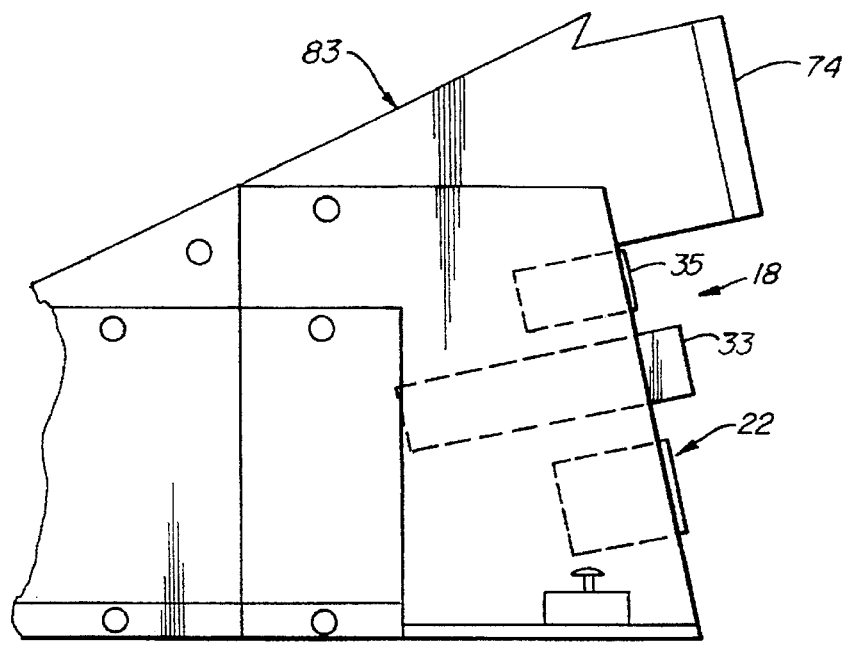
FIG. 8. Side cutaway (8A) and front (8B) views of the dashboard of the vehicle of FIG. 4.
Figure 8B:
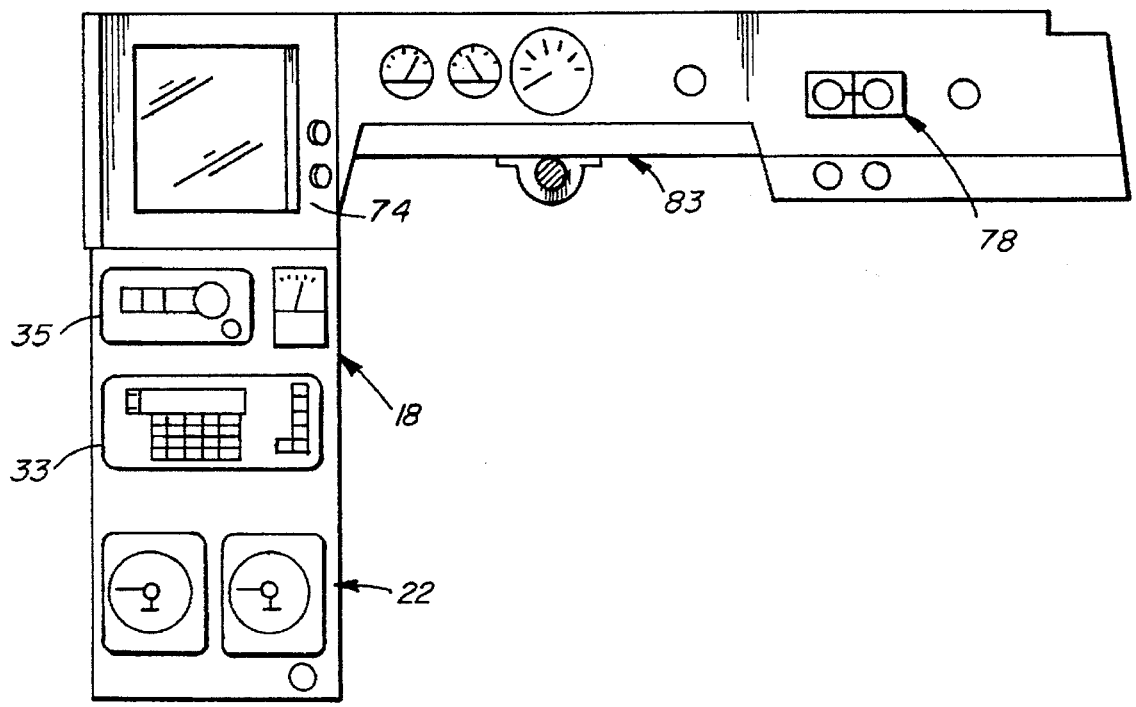

FIGS. 7A–7C show top, front and side views respectively of vehicle 12, while FIGS. 8A–8B show side cutaway and front views of dashboard 83. The vehicle carries the main control computer 22, display monitor 74, 120-volt 1000-watt power supply 77, automatic lane marking system 78, GPS navigation system 35, and a CB radio communication system with antenna 80.

Tow Platform: The tow platform 14 (FIGS. 9A–B) is connected to the vehicle 12 through a 10' tow bar 13 to reduce the impact of the vehicle's magnetic signature on data quality. The tow platform is made exclusively of non-magnetic materials including aircraft grade aluminum, bronze, titanium and fiberglass. Non-magnetic gas springs provide independent suspension. The front wheels 48 are allowed 60° excursion to either side. An 18" running clearance and a 72" overall width allows the platform to sit within the vehicle's driving shadow, allowing it to traverse any terrain the vehicle can traverse.

The seven magnetometers 16A–G are mounted, at 0.5 m intervals, on a 10' boom 15. There is space for an auxilliary eighth magnetometer. The GPS antenna 32 is at the center of the boom, adjacent the central magnetometer 16D. The magnetometers are enclosed in a composite shield and ride on a mechanism that folds into the platform should an obstruction be encountered. The same mechanism allows the magnetometers to be adjusted from 6" to 18" off the ground.

A compass, pitch and roll inclinometers, and the sensor control computer are mounted in an environmentally sealed box 17 at the rear.

2e. Navigation

An important aspect of geophysical data acquisition is the ability to routinely and robustly locate each sensor adjacent the ground whenever data is collected. Furthermore, all data must be accurately positioned to a common reference datum. The accuracy, robustness, and applicability of various GPS navigation technologies was tested for use in the present invention over a three-day deployment, and in a variety of operational conditions; 404 GPS position accuracy estimates were made. The average accuracy was 0.36 in, with 73% of the positions less than 0.5 m in error and 98% within 1 m. This level of accuracy can be achieved routinely and robustly, in realtime, using a differential GPS system (e.g., an L1 frequency, C/A code Trimble Series 4000 SSE differential GPS system available from Trimble Navigation, Inc., Sunnyvale, Calif.).

Figure 10:
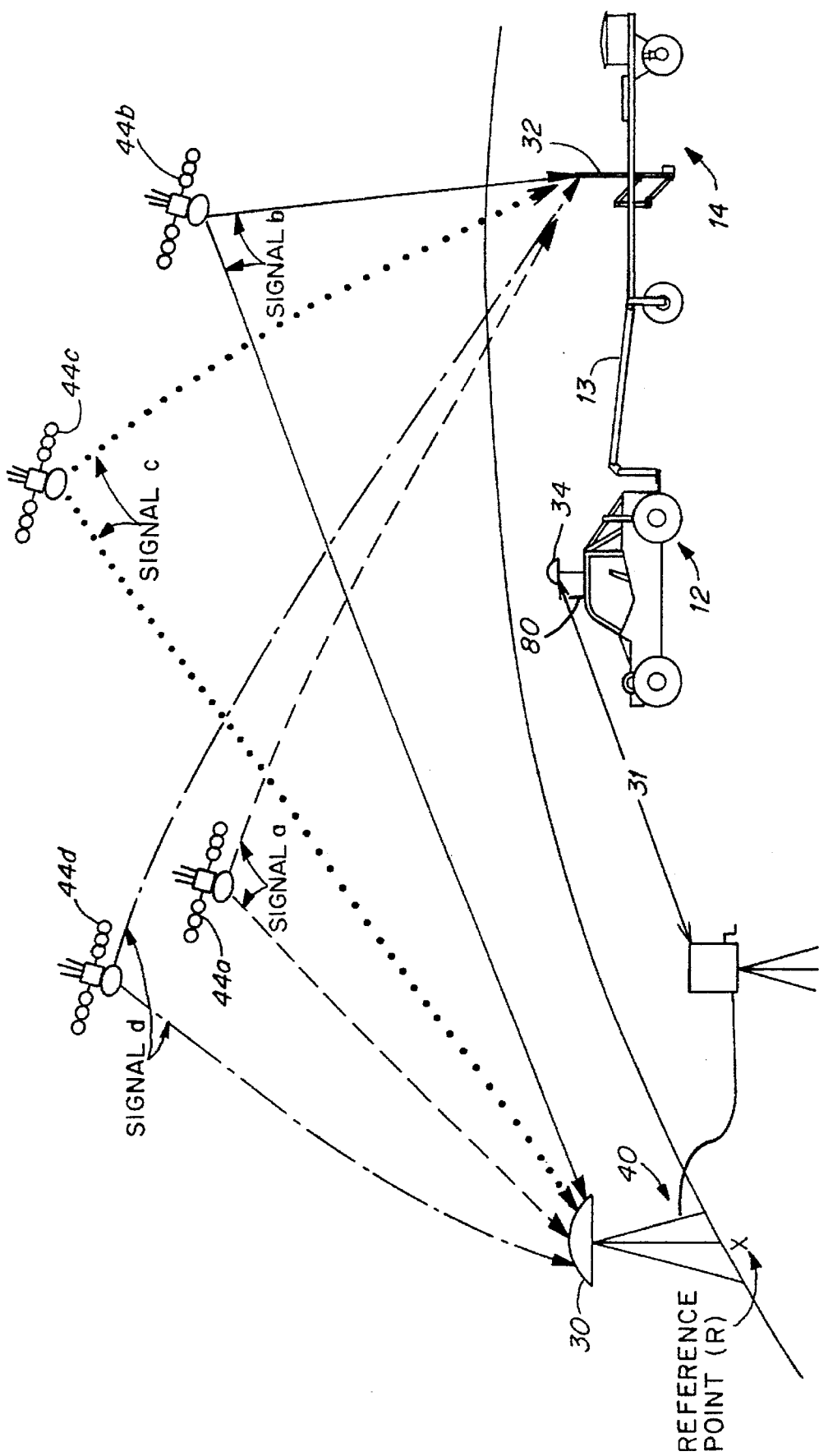
FIG. 10. Schematic illustration of the Differential Global Positioning System (DGPS) in use with the tow vehicle and platform of this invention.

In a differential GPS system (see FIG. 10), pseudo ranges from a preferred minimum of four orbiting satellites 44a, 44b, 44c, 44d are received on mobile GPS antenna 32 and recorded on a mobile receiver mounted on the sensor platform 14. (Note: a second mobile GPS antenna 34 mounted on the vehicle is used when recording landscape data.) Contemporaneously, pseudo range corrections (one for each visible satellite) are received by RF antenna 80 on vehicle 12, via an RF link 31 broadcast from a base station 40 established over a local known point (reference point—R). The base station 40 is connected to a stationary GPS antenna 30 for receiving contemporaneously pseudo range data from the orbiting satellites 44a, 44b, 44c, 44d. The second GPS antenna 34 is coupled to an RF modem 35 which receives the pseudo range corrections from the RF antenna 34 and outputs the range correction signal 36 to the GPS receiver 33. The GPS receiver outputs the ASCII position data 37 and the timing signal 38 to the synchronization manager 71. The mobile receiver determines a realtime position based on the corrected pseudo ranges, yielding decimeter accuracy. If the RF link 31 fails, or if the number of visible satellites falls from four to three, commercial postprocessing software is used to establish sub-meter positions.

In addition to the exceptional accuracy and robustness of the DGPS system, this technology also permits all data to be referenced to a common reference datum. Utilizing the WGS84 latitude and longitude system, and avoiding local coordinate systems, positions can be unambiguously re-established at a later date. Output maps and data can be converted to any local system for convenience.

2f. Reference Magnetometer

To remove the effects of the Earth's ambient magnetic field, a reference magnetometer is established outside the survey area over a magnetically clean area, and tracks the slow variations in the Earth's field. Data may be recorded at a 10 Hz rate, downloaded to the processing computer after the survey is complete, and subtracted from the magnetometer data recorded on the sensor platform.

2g. Data Processing, Image Processing and Data Analysis

Data Processing: Images of the anomalous magnetic fields are generated through a 4-stage process.

Data Positioning: First, the 20 Hz total field magnetic field data are positioned in latitude, longitude and elevation through the linear interpolation of the 1 Hz DGPS solutions. The horizontal position of the mobile GPS receiver is coincident with the center magnetometer (16D, see FIG. 9a). The position of the 6 remaining transverse sensors (16A–C and E–G) are determined through the integration of recorded compass heading data. If problems in the navigation occur, several navigation data processing procedures are available to improve the results, including: a moving average filter; a compass simulation process; and navigation data editing procedures. If the RF DGPS link 31 is lost during surveying, or if the number of visible satellites falls below three (the realtime threshold to produce a solution), then the raw pseudo ranges recorded on the GPS receivers is postprocessed to reestablish valid positions.

Signature Isolation: Second, the primary goal of the data processing step is to determine the magnetic field anomaly caused by ferromagnetic objects. In order to remove from the data the effects of the Earth's magnetic field, data from the reference magnetometer is subtracted from the recorded data. This allows the survey to proceed without loss of data quality during strong fluctuations in the Earth's ambient magnetic field.

Interpolation: Third, the total field magnetic anomaly data is interpolated onto a 10 cm north/south/east/west grid using a nearest neighbor bilinear interpolation scheme. This step allows for convenient manipulation and display of the data.

Display: Fourth, the data are displayed as an image on a Unix workstation. Magnetic anomaly levels are mapped to gray scale or pseudo-colors, and a wide variety of image display and enhancement tools are made available to the user.

Figure 11:
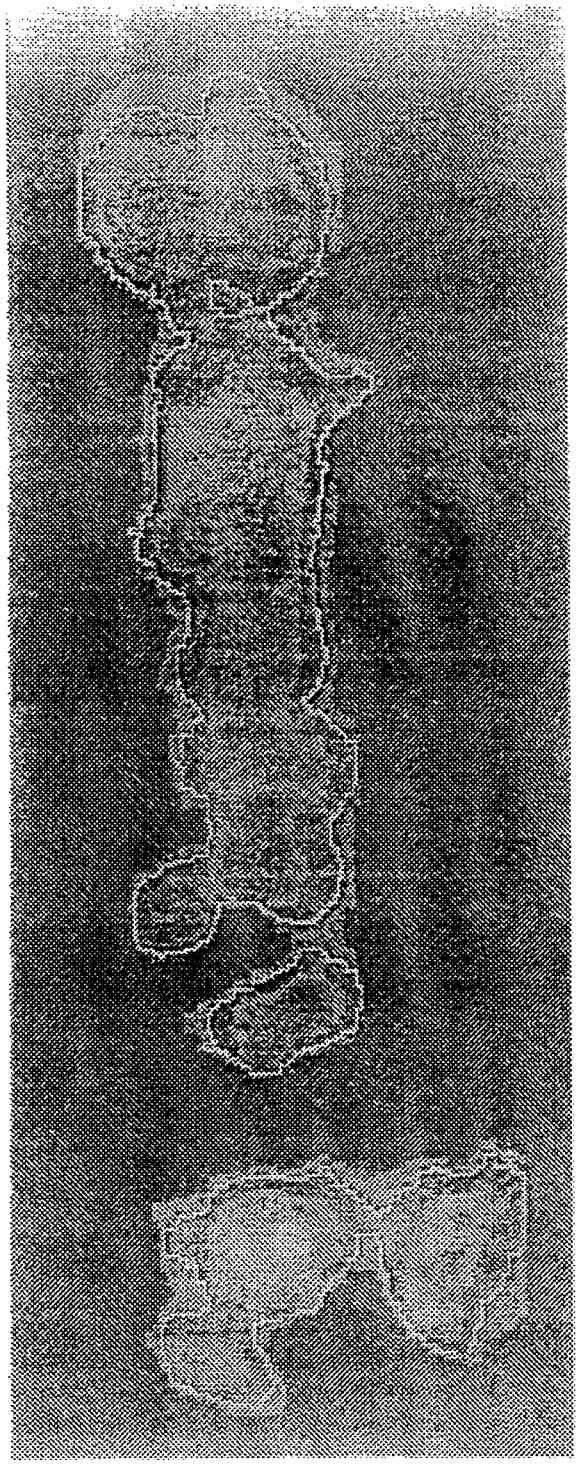
FIG. 11. Image of a trench at Sandia National Laboratory which may contain several barrels of radiological waste; 9-point centered median filter applied to image to remove spurious data and to fill in small areas where survey coverage was incomplete; Sobel gradient edge detector applied to define the pit boundaries.

Image Processing: Image processing techniques are used to enhance the data collected. Several procedures can be used to enhance image quality, segment images into regions and extract image features. FIG. 11 shows an image of a burial trench at Sandia National Laboratory which may contain several barrels of radiological waste. A 9-point centered median filter was applied to the image to remove spurious data and to fill in small areas where survey coverage was incomplete. A Sobel gradient edge detector (Canny, J., "A Computational Approach To Edge Detection," IEEE Transactions On Pattern Analysis And Machine Intelligence, PAMI-8(6): 679–698, 1986) was applied to define the pit boundaries. This image processing approach to waste site characterization is useful when the anomalous objects cannot be routinely modelled.

In addition to the application of image enhancement and edge detection techniques, magnetic anomaly images can be segmented into regions with statistical similarities from which features can be extracted. FIG. 12A (top left) shows an image which has been segmented into several regions through the application of an intensity-based region segmentation procedure. Attributes such as the height:width ratio vs. pixel count (FIG. 12C, bottom) are determined for each segment to facilitate empirical feature space correlation studies. FIG. 12B (top right) shows the image with all segments which are round and large. Observation of clustered features define rules for automatic anomaly detection and characterization and may be incorporated into the data acquisition software.

Data Analysis: When the signature of a buried ferromagnetic object is isolated with no overlapping signatures from other objects, and the signature is morphologically simple, then generally the anomaly can be successfully modelled as a point dipole (see object 4 in FIG. 1). The system uses a model matching scheme which iteratively minimizes a chi-squared cost function for free parameters including: the magnetic dipole moment, horizontal position, depth, dipole inclination and dipole declination.

This approach is a modification of that of McFee, J. E. and Y. Das, "Determination Of The Parameters Of A Dipole By Measurement Of Its Magnetic Field," IEEE Trans. on Antennae Propagation, AP-29:282–287, 1981, and allows for the free orientation of the point dipole. Often it is incorrectly assumed that the dipolar anomaly is orientated in the direction of the Earth's field. The orientation of a dipole source signature is a superposition of the remnant and induced secondary magnetic fields. The induced field is aligned with the Earth's field, whereas the remnant field is dependent on the geometry and orientation of the object, and the permanent magnetization of the ferromagnetic material.

2h. Field Examples

In this section, the results of two surveys are presented.

Figure 13:
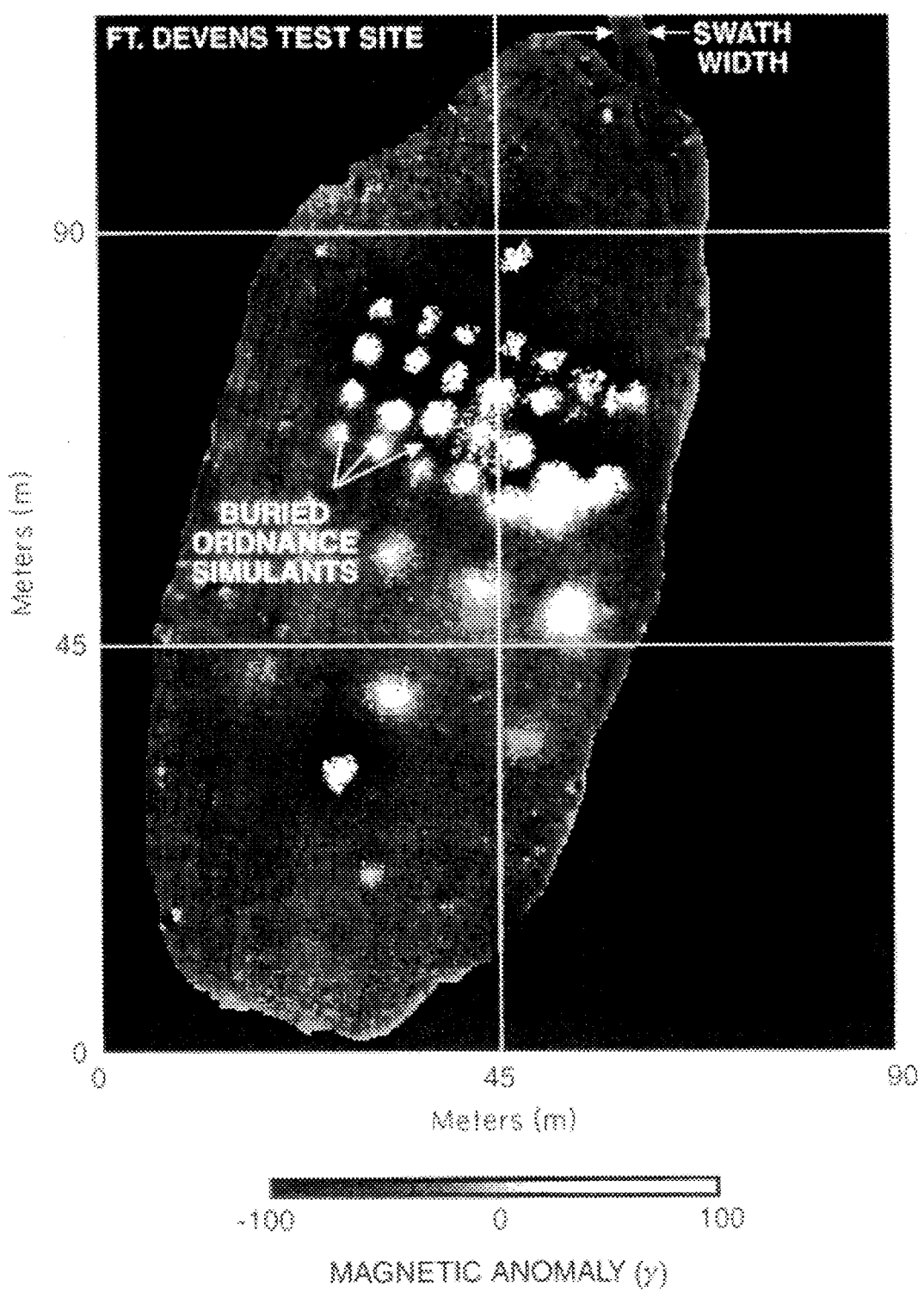
FIG. 13. Ft. Devens, Mass. survey map; rows of buried ordnance simulants at this test facility range from inert surface ordnance, to 250 Kg bombs at 5 m.

Ft. Devens, Mass.: Ft. Devens is located in eastern Massachusetts. The terrain at the site is variable, from flat to quite hilly. The test area has been used for bivouac training and contains deep ruts (18" and greater) from armored troop vehicles and tanks. The total area surveyed was 7.8 acres, which was surveyed at a rate of 2.6 acres/hour. The results are shown in FIG. 13. All areas were successfully surveyed with positional accuracy between 10 to 30 cm. All the buried simulants were detected, ranging from small ordnance simulants on the surface (2 kg) to 250 Kg bomb simulants at depths of 5 m.

Figure 14:
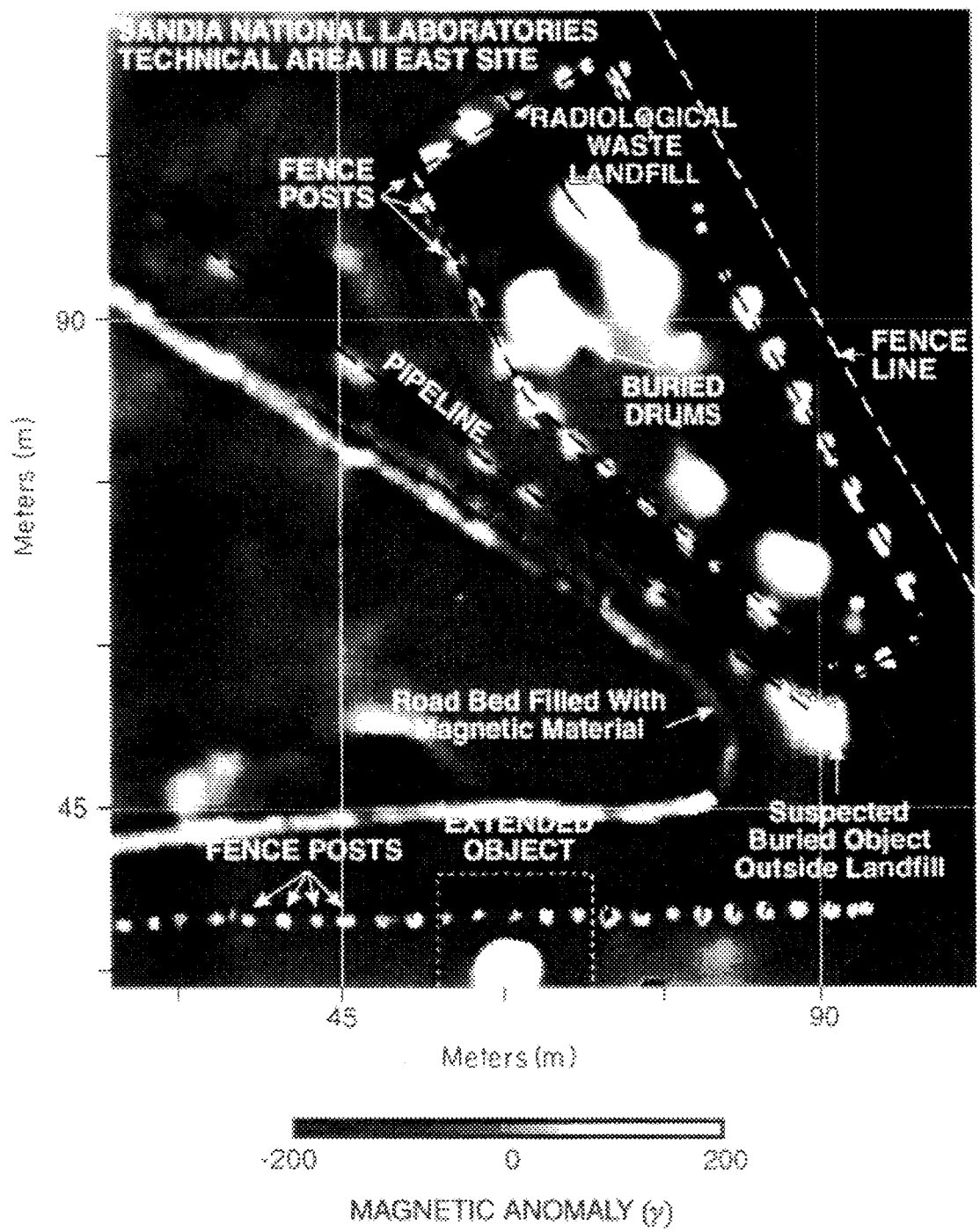
FIG. 14. Sandia National Laboratory Technical Area II East survey map; system detected benign objects including old roadbeds, drainage pipes, and fence post, as well as several drums in a radiological waste site and several unknown objects throughout the site.

Sandia National Laboratory Technical Area II: This area at Kirtland Air Force base in New Mexico includes a former weapons assembly facility and radiological waste landfill and a suspected chemical waste landfill (FIG. 14). The survey was performed as a background characterization survey, and as such culverts, pipes, and a septic system were delineated and several previously unknown anomalies were detected and characterized. Additionally, the system was deployed to detect and characterize underground buried hazardous material containers at a chemical waste and a radiological waste site. The system detected and characterized in terms of location, size and depth, several objects including: old roadbeds, fence posts, pipes, barrels and trenches containing waste containers.

3. Data Acquisition Hardware

Figure 15:
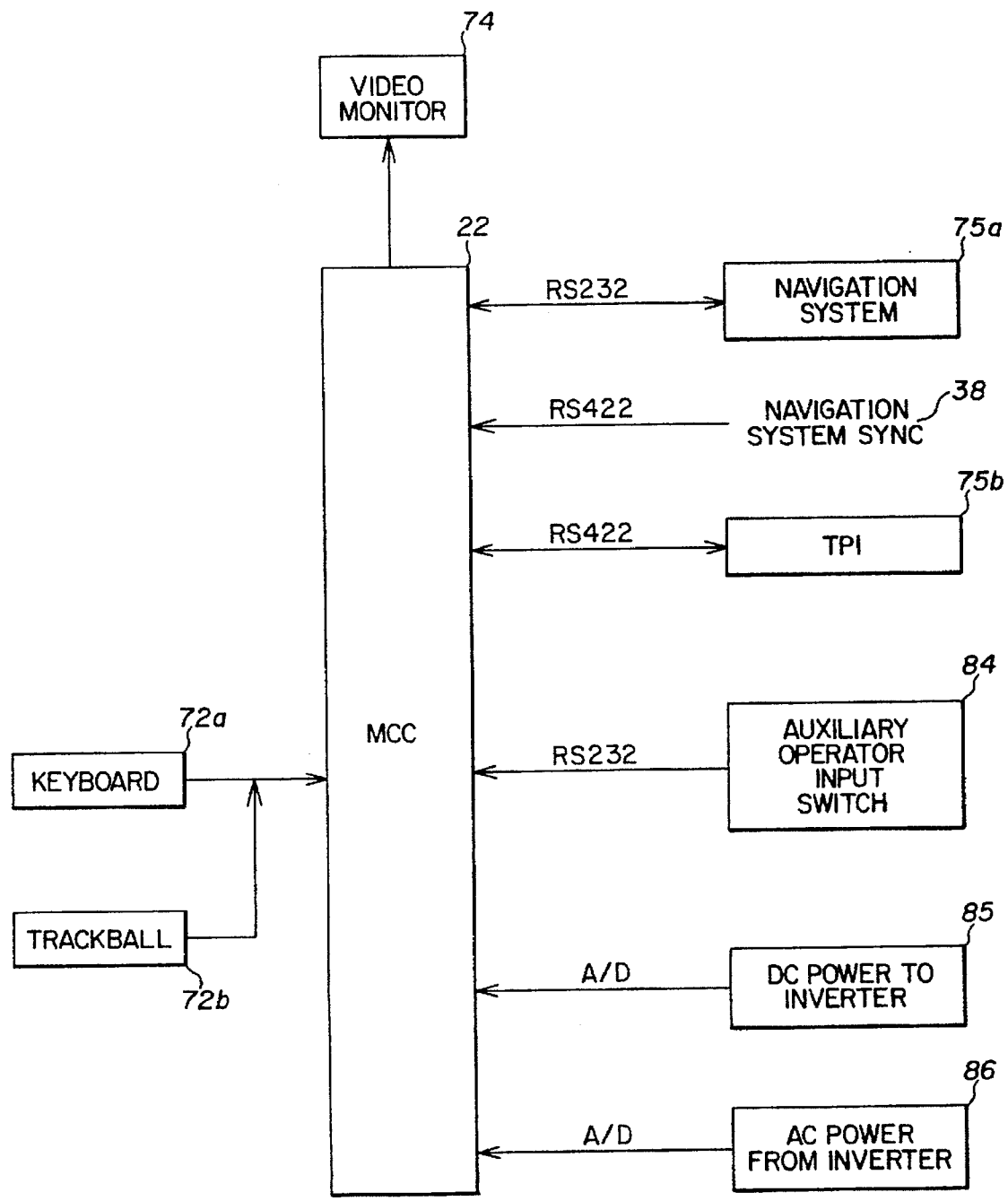
FIG. 15. Block diagram of main control computer (MCC) interfaces.
Figure 16:
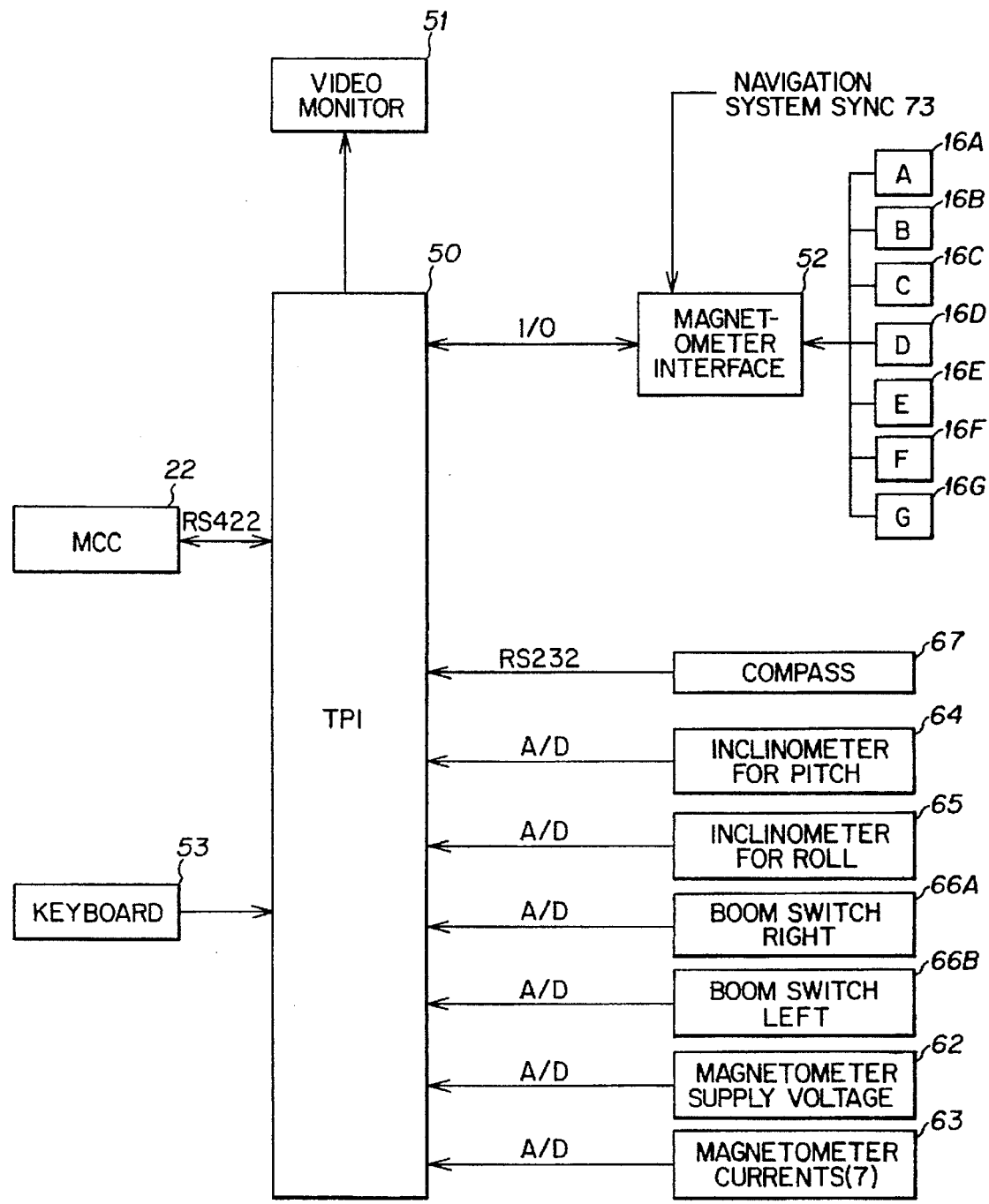
FIG. 16. Block diagram of tow platform interfaces (TPI).

As shown schematically in FIG. 15, the main control computer (MCC) 70 on vehicle 12 is an IBM-compatible PC with a keyboard 72a and video monitor 74 for operator input and display. The MCC is of ruggedized construction in order to withstand the rigors of operation in a moving vehicle in bumpy terrain. The MCC keyboard features a trackball 72b option to facilitate input; it is easier for the operator to use a pointing device like a trackball to point-and-click on a selection, rather than using keystrokes, for Windows-based software. (In contrast, the keyboard 53 for the tow platform interface (TPI)(see FIG. 16) may be a standard keyboard since the software running in the TPI is DOS-based, the TPI 50 also includes a monitor 51 for operator display). An auxiliary input device 84 allows the operator to put the system in one of two states, either "suspend" or "acquire" during the survey operation. An Ethernet port may be incorporated in the MCC to allow network connectivity and provide an alternative way to transfer data.

Figure 17:
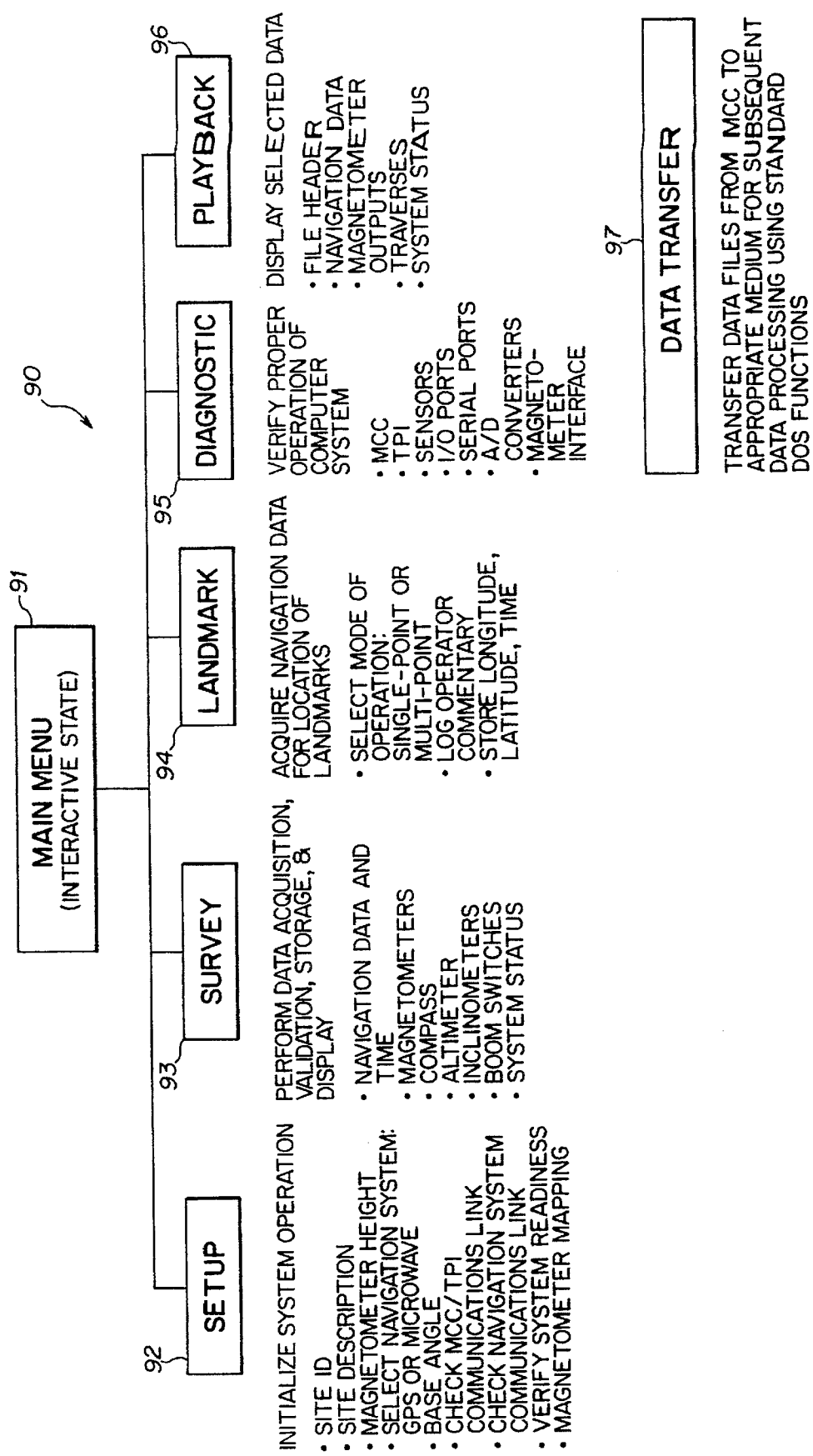
FIG. 17. Block diagram of data acquisition software.

After power-up, the data acquisition software is loaded into RAM after which the MCC will display a Main Menu (see 91 in FIG. 17) and the TPI will be ready to accept commands from the MCC. The MCC 70 will communicate with the TPI 50 via commands dispatched over a serial interface 75b.

A variety of physical quantities are measured by the data acquisition system. Sensor outputs are routed through special hardware interfaces. Software conversion is required for processing the input quantities. A/D converters are installed in the MCC and the TPI to convert analog values of the DC and AC power to digital quantities for input to the computer (see 85–86 in FIG. 15).

Sensors mounted on the TPI include magnetometers 16A–G, compass 63, inclinometers 64–65, and boom switches 66A–B. In order to accommodate these sensors, a multi-channel serial interface and a multi-channel A/D Converter are provided. These are standard off-the-shelf peripheral boards which will plug directly in the PC chassis. The serial interface 56 is utilized to input the signal from the compass. A/D converters 54 are utilized to convert the outputs of the inclinometers which are employed to measure pitch and roll. A programmable magnetometer interface 52 acquires and stores magnetometer data at predefined intervals. Double buffering of the data in the magnetometer interface allows data to be read without having any affect on data currently being stored.

4. Data Acquisition Software 4.1 Overview

The data acquisition software 90 runs under the MS-DOS 5.0 operating system and is co-resident in two PCs, the MCC 70 and TPI 50. The data acquisition software 90 includes an initial setup mode 92 for initializing operation of the software by providing data such as a description of the sites to be surveyed, a type of navigation system, and the like. The software is implemented using C++. FIG. 19 is a block diagram of the data acquisition software.

An 80486-based main control computer (MCC) on the vehicle is the primary operator interface for survey operations. The MCC logs all survey data communicated to it, displays real time status and traversed information, and provides data transfer, playback and system diagnostics. Another 80486-based computer on the tow platform serves as the tow platform interface (TPI), which acts as an intelligent data concentrator that is under the control of the MCC and the navigation system. Its function is to coordinate platform data acquisition, buffer and format all platform data, provide pre-processing potential, and communicate all data to the MCC via an RS 422 interface on demand. The main technical justification for the separation of computer tasks is to reduce cabling between the vehicle and tow platform, thus reducing noise sucessibility and improving overall robustness.

The primary function of the data acquisition software is to create survey data files (see 93 in FIG. 17) which are subsequently processed by another program running in a Unix-based workstation to generate image contour maps identifying where ferromagnetic objects are located. The software provides the interface to the data acquisition system, controls the system, and relates all the information about the system. Microsoft Windows™ 3.1 is used for the MCC software to provide a graphical user interface, graphics, and multi-tasking. The software in the TPI does not operate under Windows™ since the need does not exist for a graphical user interface. The TPI software normally operates in a "looping" mode, however, it can be put into a special "diagnostic" mode in which a menu is displayed from which individual diagnostics may be run to verify the operation of the hardware.

4.2. Survey State

Figure 20A:
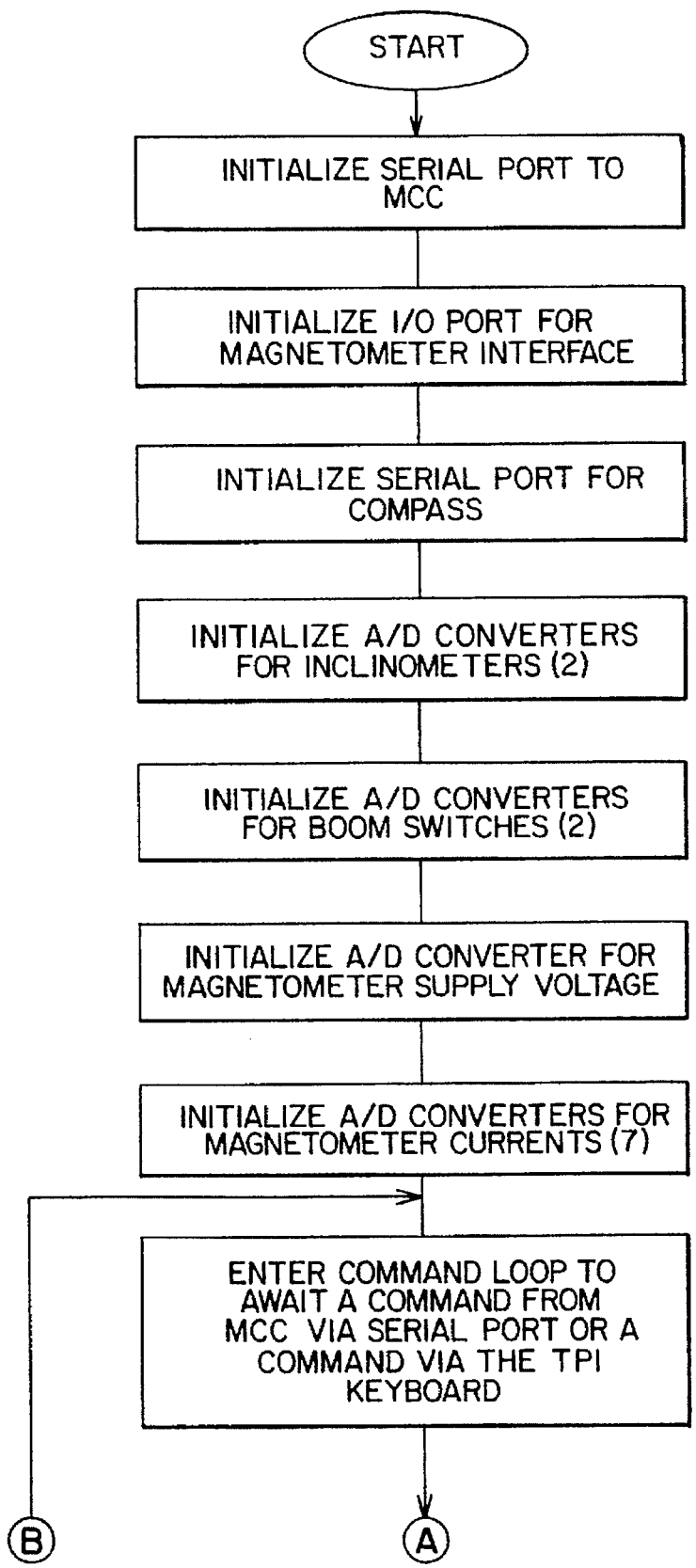
FIGS. 20A–C. Flow chart for operation of TPI in SURVEY mode.
Figure 20B:
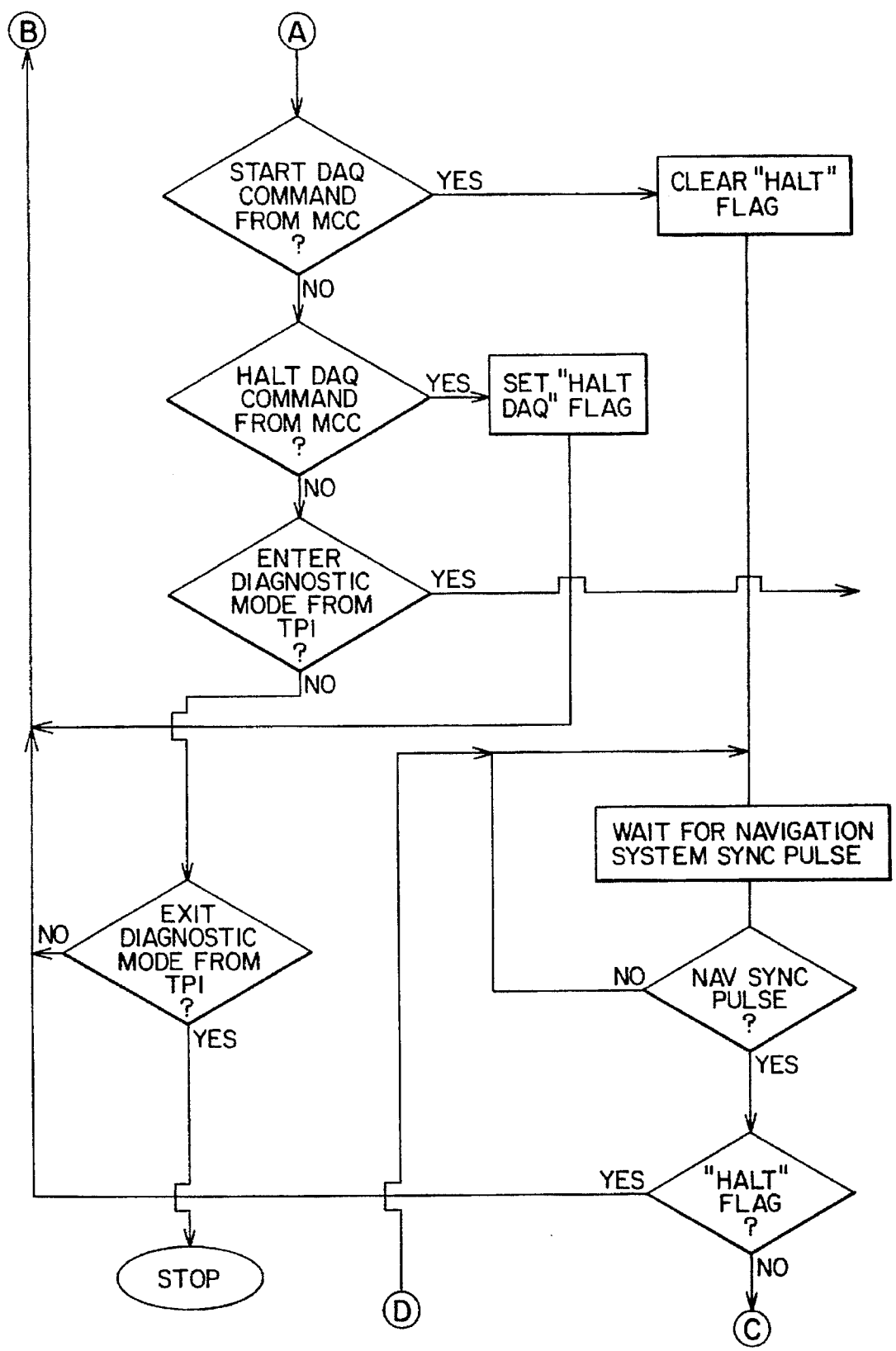
Figure 20C:
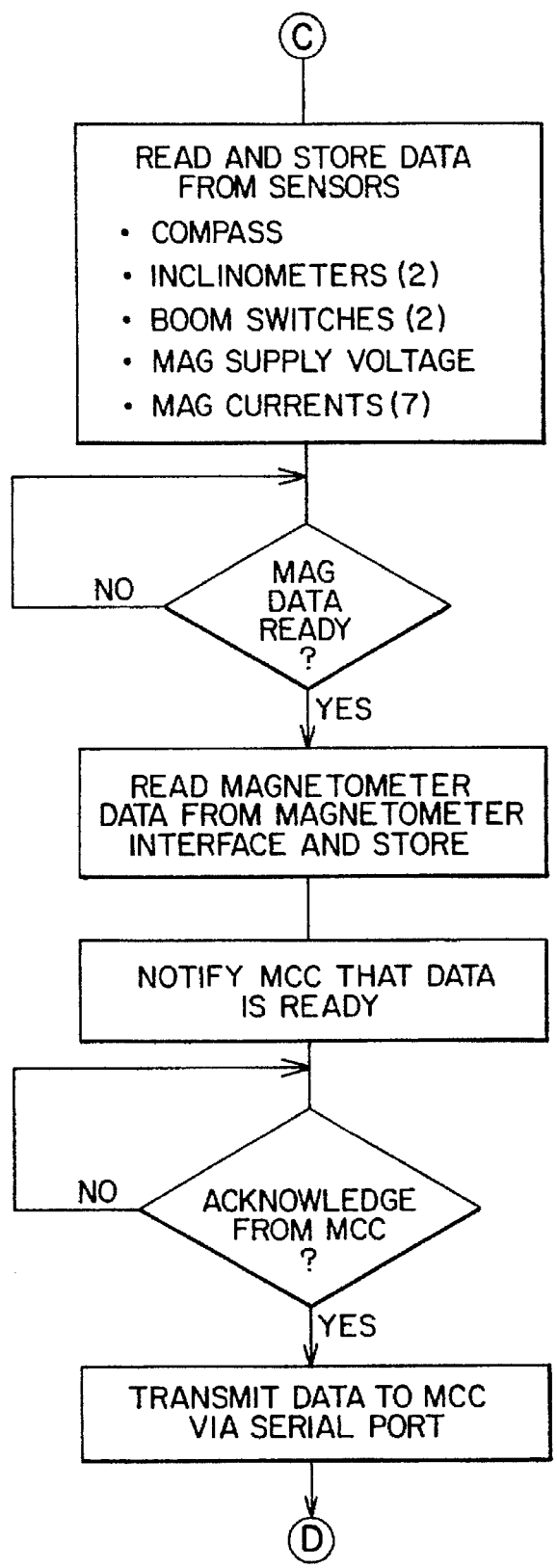

SURVEY mode (see 93 in FIG. 17) is the primary operational state of the system. FIGS. 19A-D are a flow chart illustrating the operation of the MCC in the SURVEY mode; FIGS. 20A-C are a flow chart illustrating the corresponding operation of the TPI in the SURVEY mode.

In this mode of operation, raw data is collected for subsequent processing by the data processing software to identify, quantify, and locate magnetic anomalies. Data acquisition is triggered by the receipt of a sync signal from the navigation system at 1-second intervals. Receipt of the sync causes the MCC to initiate a sequence to acquire data from the navigation system, local sensors, and from the TPI. The TPI also starts a sequence to acquire data from all the sensors. At the end of each second, the TPI alerts the MCC when data is ready. When the MCC receives this notification from the TPI, it will read the data via the serial port and inspect, store, and display the data.

During each cycle of operation, a variety of sensors are employed to acquire the following data:

Latitude/Longitude

Time

Magnetometers (7)

DC power

AC power

Magnetometer voltage

Magnetometer currents (7)

Compass

Inclinometers (2)

Boom switches (2)

Figure 6:
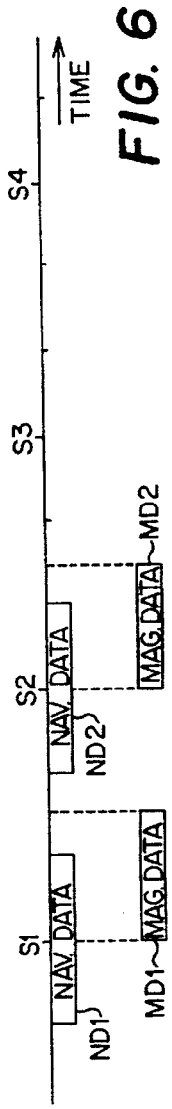
FIG. 6. Time scale showing synchronized collection of navigational and magnetometer data.

The receipt of the sync pulse initiates a chain of events in the data acquisition cycle (see FIG. 6). Since the navigation system goes through a processing operation to calculate the latitude and longitude, the MCC will have to wait until this data is available. The sync pulse simultaneously signals the TPI to start acquiring data. The magnetometer data is sampled 20 times per second. The TPI will obtain 5 bytes of data from each of the 8 magnetometer channels. Actually, 7 magnetometer's are physically present and the data from the extra channel will be discarded. The extra magnetometer channel can be employed as a backup in the event that one of the other channels malfunctions. At a sampling rate of 20 Hz, a total of 800 bytes of magnetometer data will be acquired per second. In order to conserve storage space, a data compression scheme is utilized for storing magnetometer data; for example, when changes in the magnetometer data fall below a predetermined limit value, only the difference (from one sample to the next) is stored. The MCC is only concerned with storing the magnetometer data and not with interpolation of the magnetometer data. The interpolation of the magnetometer data will be performed by the data processing software when mapping the survey data. In addition to the magnetometer data, the TPI also samples data from the compass, inclinometers, and boom switches. When the TPI has completed the data acquisition cycle, it will signal the MCC which will read in the data over the serial port. The MCC will examine the incoming data to assure that it is within acceptable limits. If any value is considered unacceptable, the operator will be alerted. Sensor data and system status will be displayed in realtime during survey operations. The MCC will go through a continuous process of data input, validation, storage, and display.

In order to circumvent the possibility of losing data during the survey operation, the data will be stored and saved at the end of each cycle of acquiring data. The data will be saved on both the MCC hard disk as well as on a portable non-volatile media. These features are built into the software to minimize the possibility of a loss of data.

Rough terrain causing the vehicle to have irregular movement during the SURVEY state dictates that operation of the system be limited to a minimal number of operator movements. The number of operator actions can be reduced to three: (1) "suspend" data acquisition, (2) "acquire" data, and (3) return to the Main Menu (interactive state). The operator, by merely pressing a switch within easy reach, may make entry into the "suspend" state or the "acquire" state. Return to the Main Menu is accomplished by first putting the system into the "suspend" state and then pressing the "Esc" key on the keyboard.

In order to keep file handling transparent to the operator, a file naming convention is used which employs the site ID, day of the year, and a file number. The file extension "mag" will identify the type of data stored in the file. This naming convention also serves for identification of files which have been created during a particular time frame. Appropriate file formats are used for storage of data.

Figure 18:
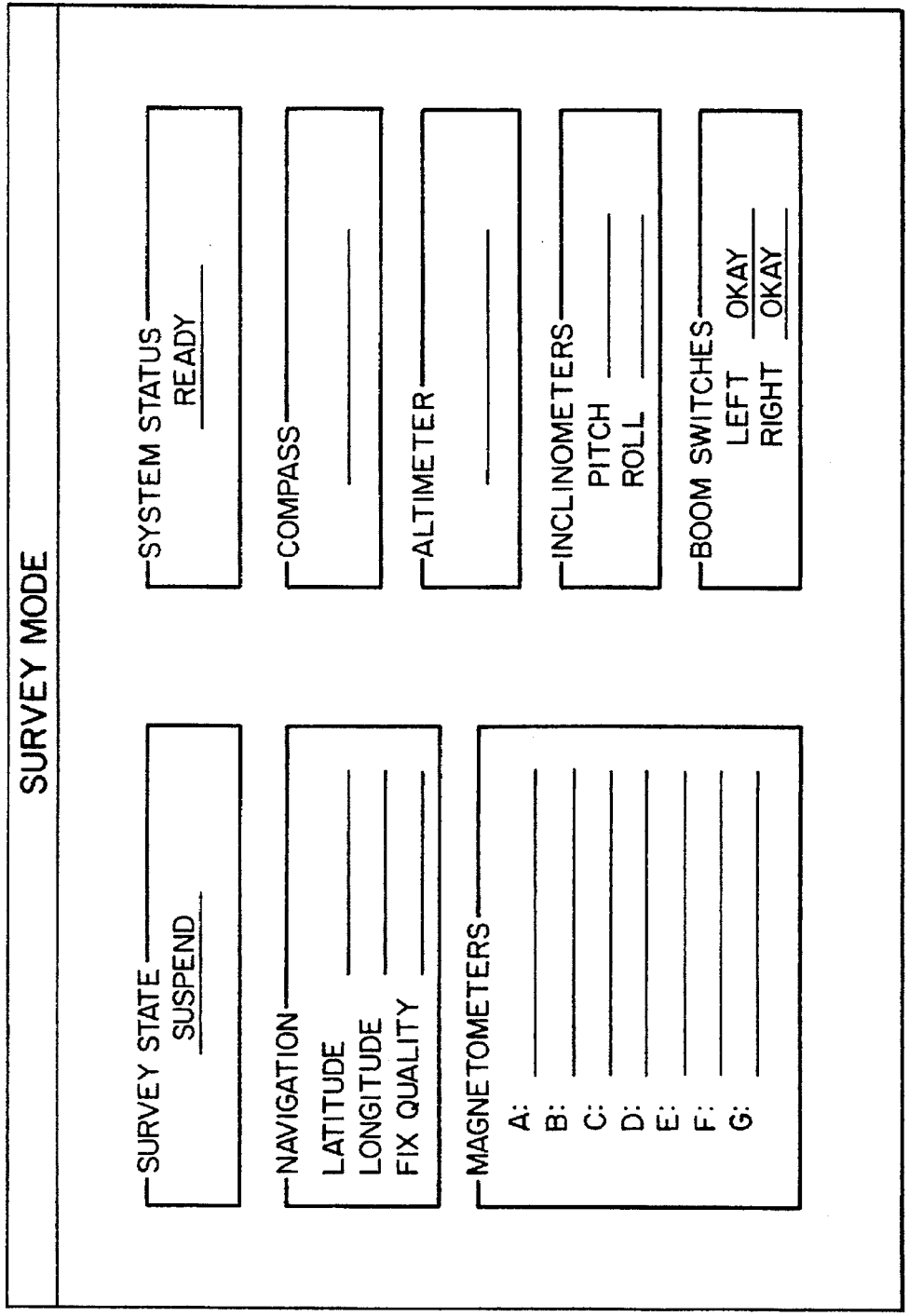
FIG. 18. Operator display screen showing an output in the SURVEY mode.
Figure 19A:
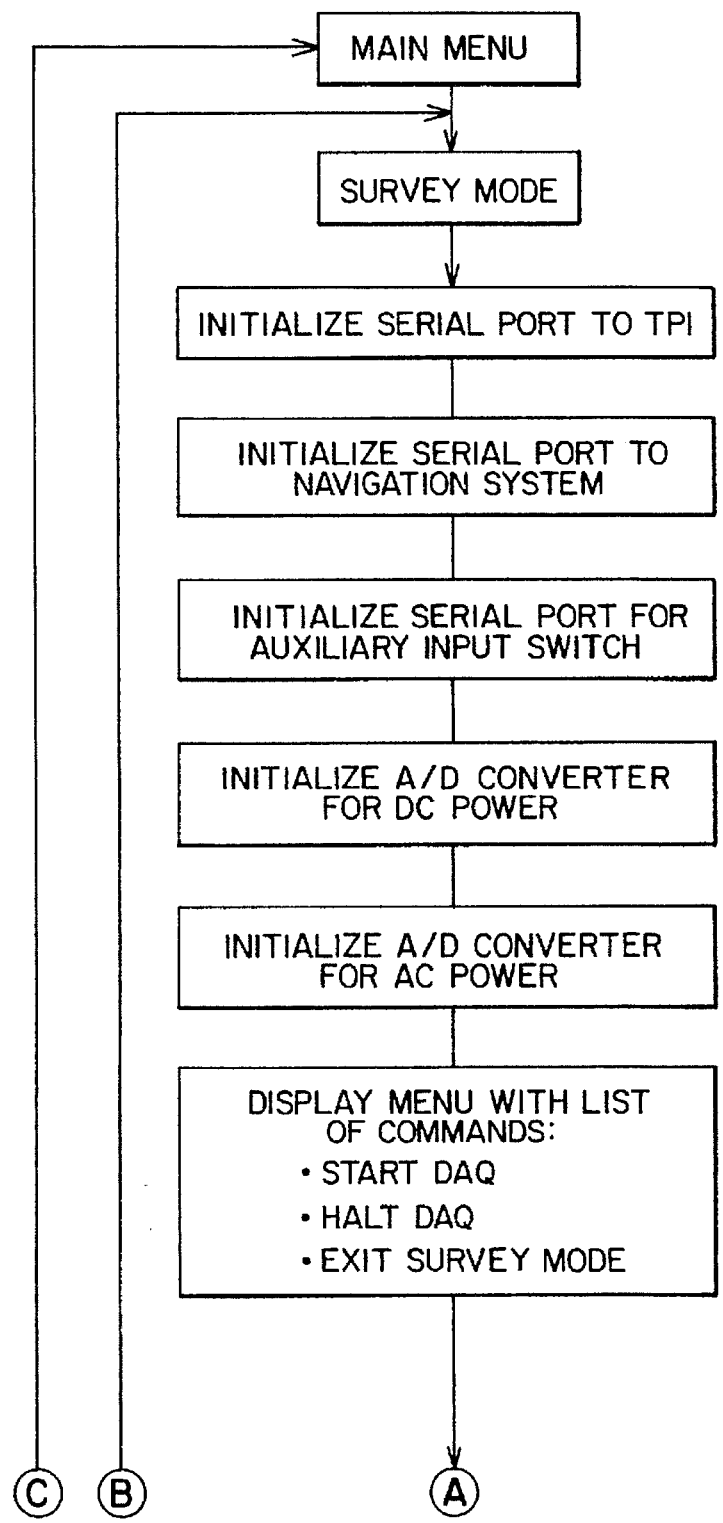
FIGS. 19A–D. Flow chart for operation of MCC in SURVEY mode.
Figure 19B:
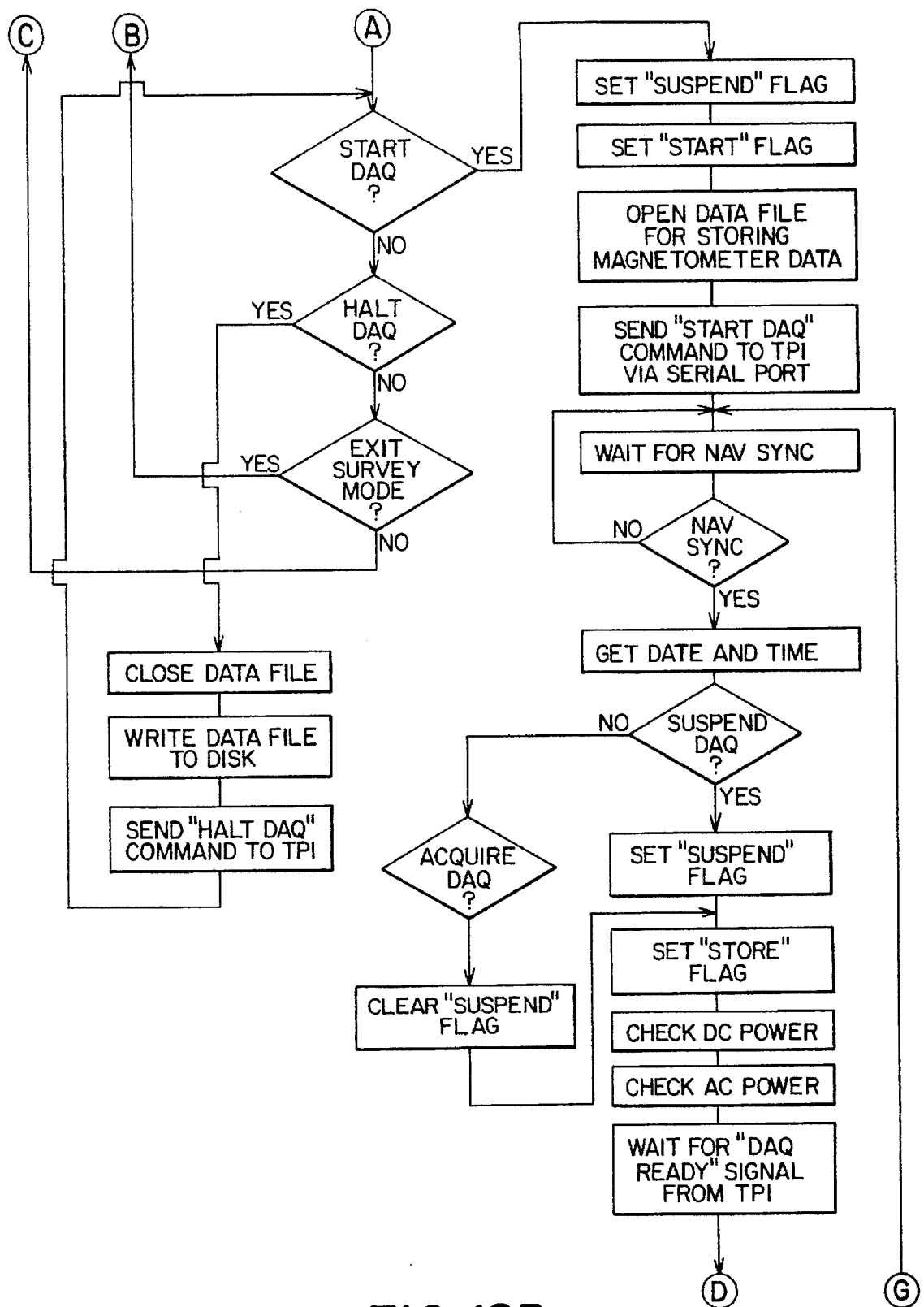
Figure 19C:
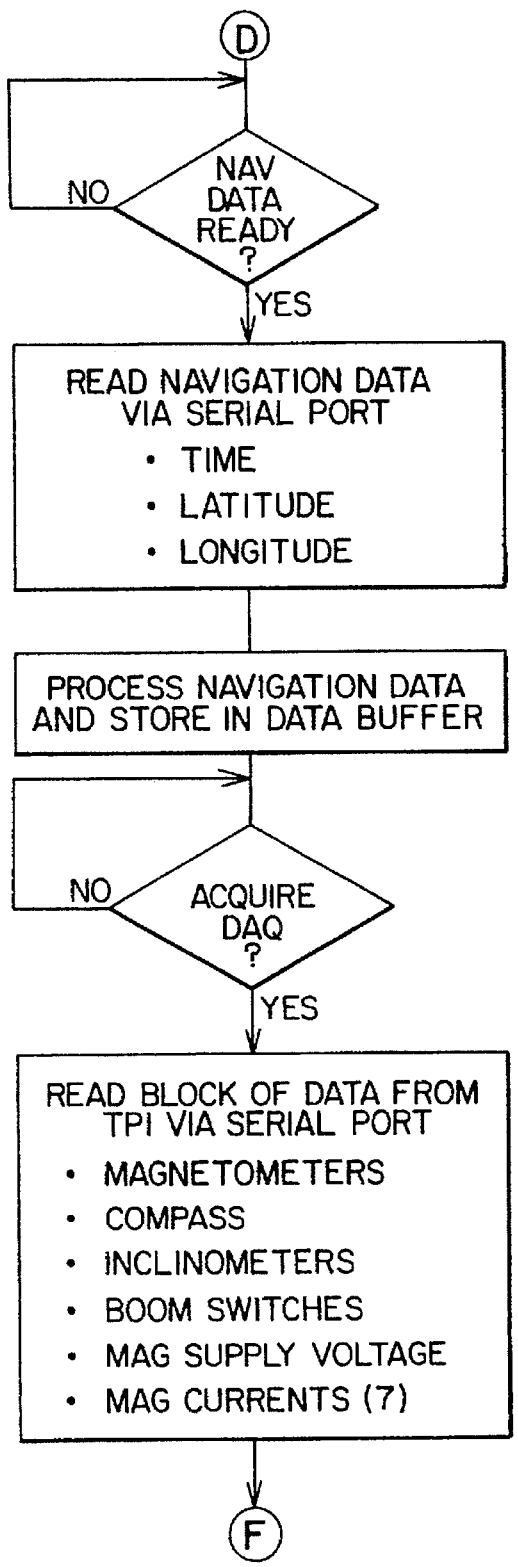
Figure 19D:
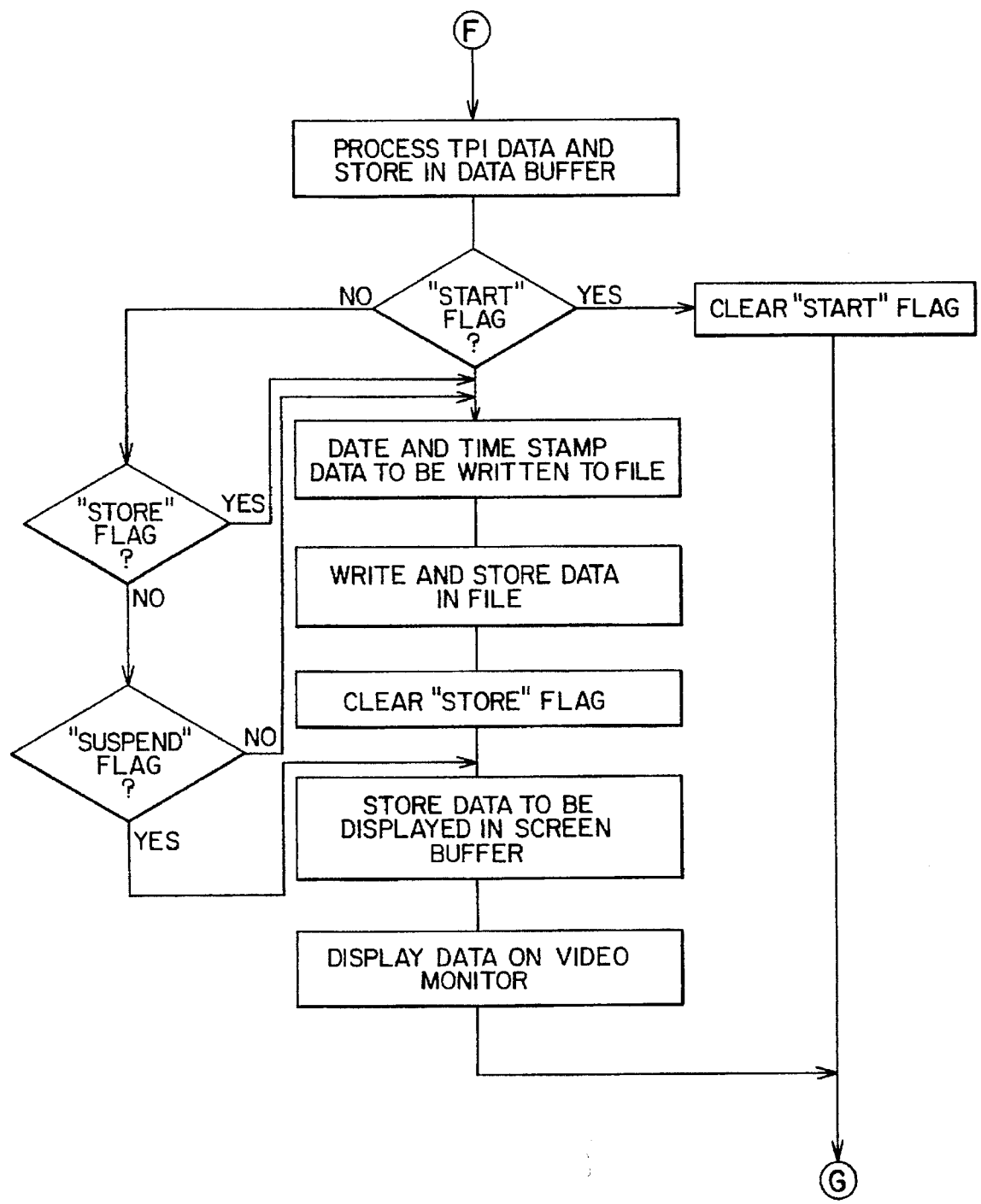

The operator is kept apprised of survey operation by displaying data of interest including state of SURVEY mode (either "suspend" or "acquire"), system status, navigation data, magnetometer data, compass, inclinometers, and boom switches (refer to FIG. 18). The monitor displays are designed so as to provide the operator with a clear view of system operation.

4.3 Landmark State

In the LANDMARK state (see 94 in FIG. 17) the vehicle operates without the tow platform. The sole purpose of this state is to collect navigation data (via GPS antenna 34) for identification of what may be considered to be "landmarks". The landmarks to be recorded will include single points as well as extended objects of irregular shape. In order to accommodate these two kinds of landmarks, the LANDMARK state offers two modes of operation: (1) Single-Point and (2) Multi-Point.

A file for storage of landmark data with a file extension "lnd" will be created. The system may be put into a "suspend" state to stop acquiring data or into an "acquire" state to acquire data. Commentary describing each landmark may be input into the system via the keyboard.

4.4 Diagnostic State

The DIAGNOSTIC state (see 95 in FIG. 17) serves to verify the proper operation of individual components in the system. At power-up of the PCs, BIOS performs a self-test of the PC hardware. Data validation and monitoring of system status performed during survey operation will serve to assist in identifying a faulty component in the system. Diagnostic tests can be developed for any hardware which is "visible" to the CPU, i.e., any hardware installed in the system bus.

4.5 Playback State

The PLAYBACK state (see 96 in FIG. 17) provides the facility to selectively access and display data. Selectively viewing data should be of interest in examining data on an individual basis. The data may be readily accessed since specific data is located in predefined fields. This function entails selecting a file, opening the file, extracting the data of interest, converting the data to appropriate form for display, and then displaying the data on the screen.

4.6 Data Transfer State

The DATA TRANSFER state (see 97 in FIG. 17) is operational in the MS-DOS mode which is entered by exiting from the graphical operational environment of Microsoft Windows and utilizing standard DOS commands to transfer data files from the hard disk to a removable storage device such as floppy disk. The installation of an Ethernet Network Interface Card offers the capability to transfer data from the MCC to another PC equipped with a Network Interface Card.

5. Data Processing Software

As previously discussed, the data acquisition system will acquire magnetometer, navigation, positional, and status data utilizing an 80486-based computer (MCC) running MS-DOS. Vehicle survey data will be stored in ".mag" files written onto a PC-compatible nonvolatile transfer medium (e.g., removable hard disk, flash EPROM, etc). Files containing "landmark" data (navigation data only with no magnetometers) will be stored in ".lnd" files. Both ".mag" files and ".lnd" files will be transferred in an off-line fashion to the data processing computer.

Contemporaneously collected data from a single stationary reference magnetometer (also called a diurnal variation station) measuring fluctuations in the earth's ambient magnetic field will be stored in PC-readable files created by commercial software supplied with the magnetometer. This reference data file (file type ".ref") will be transferred in an off-line fashion via floppy disk to the data processing computer.

The navigation system is a Differential Global Positioning System (DGPS) with commercial postprocessing capability. The navigation system supplies real-time position data at a 1 Hz rate to the MCC. The MCC stores these real-time 1 Hz position updates in the .mag file.

The navigation data may be postprocessed by commercial PC-based GPS postprocessing software to achieve greater accuracy than is possible with real-time kinematic differential GPS. When postprocessing is desired, the raw data from the both the kinematic and static (differential) GPS receivers will be manually downloaded to a portable PC via Trimble-supplied software. The postprocessing software, supplied by Trimble (or equivalent), will read the raw kinematic and static data files and produce a separate output file of postprocessed navigation data. This file will be written to floppy disk and transferred to the data processing software. The postprocessed navigation updates will then improve upon the real-time 1 Hz navigation updates originally stored in the mag file.

The data processing software will read the navigation data in the ".mag" files and allow the operator to determine the area over which data are to be processed. The software will then read the magnetometer, navigation, position, and status data collected on the vehicle and stored in a mag file, read the data file from the reference magnetometer, calculate the correct position of each individual magnetometer reading, and subtract the correct contemporaneous reference magnetometer value. There is the capability to merge multiple data files acquired over the same physical area.

Once data are processed, the software will create "bird's eye" images of the anomalous magnetic field readings. An operator will then view these images in a window of a computer screen, and using an interactive mouse-driven Area of Interest (AOI), will be able to extract the location, size and depth for each isolated magnetic dipole. The accuracy of the depths and locations will be dependent on the quality of the data. Color or monochrome hardcopies of the images and text hardcopies of the target locations will then be printed.

In addition to the vehicle-based data acquisition system, there is also be a non-vehicular portable adjunct (see Section 7) which will work in conjunction with the same commercial differential GPS hardware and diurnal variation station and will produce a ".mag" file of the same format as the vehicular system. As such, the data processing software will be able to process data from the portable system, either in stand-alone form or merged with vehicular data, and generate the same "bird's eye" images as from the vehicular system. As with vehicular data, the accuracy of the data analysis will depend on the quality of the data.

There is also commercially available from Geo-Centers, Inc., Newton Centre, Mass. STOLS data processing software for creating contour maps from the data acquisition files.

6. Magnetometer Interface

Figure 21:
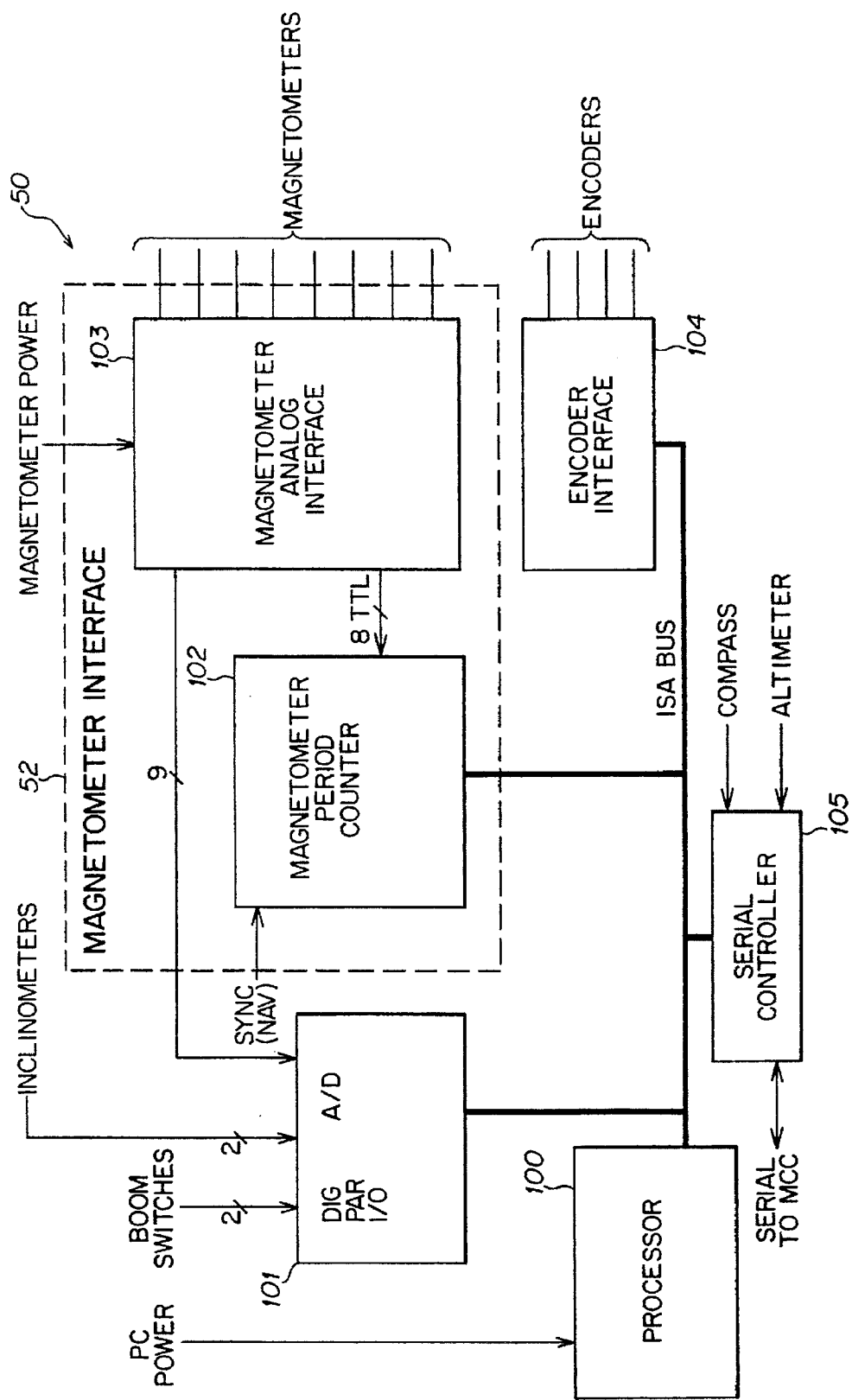
FIG. 21. Block diagram of tow platform interface (TPI) hardware.

FIG. 21 shows the hardware design for the tow platform interface (TPI) 50. The TPI is an intelligent data concentrator that is under the control of the MCC and navigation sync pulse. Its function is to coordinate platform data acquisition, buffer and format all platform data, provide preprocessing potential, and communicate all data to the MCC via RS422 on demand.

The TPI controller is a DOS compatible 80486 PC with a minimum clock of 25 MHz. The TPI is enclosed in a weatherproof enclosure, shock-mounted to the tow platform, and may include the following additional hardware:

An optional encoder interface board 104 to monitor the outputs of up to four differential wheel encoders with index monitoring as auxiliary position data to be logged by the MCC and passed to the navigation subsystem.

Serial controllers 105 to communicate with the MCC, compass, and other serial sensors such as an altimeter.

A/D and I/0 board 101 to input analog sensor data and status input from power supplies, boom switches, magnetometer current, and inclinometers.

The magnetometer interface 52 is designed to decouple, sample and digitize the outputs from up to 8 cesium vapor magnetometers at selectable rates up to 20 times per second. It consists of a magnetometer analog board 103 and a magnetometer period counter board 102. The interface is designed to have eight channels, providing one spare.

The cesium vapor magnetometers provide an output frequency proportional to the magnetic field. This frequency, called the Larmor frequency, ranges from 70 KHz to 332.5 KHz. The Larmor frequency is 3.49853 times the magnetic field intensity in gammas, so the range is 20,000 to 95,000 gammas. The Larmor frequency is coupled onto the power line of the magnetometer, 30 V nominal. The magnetometer/power voltage and current monitoring and signal decoupling is done by the magnetometer analog board 103.

Figure 22:
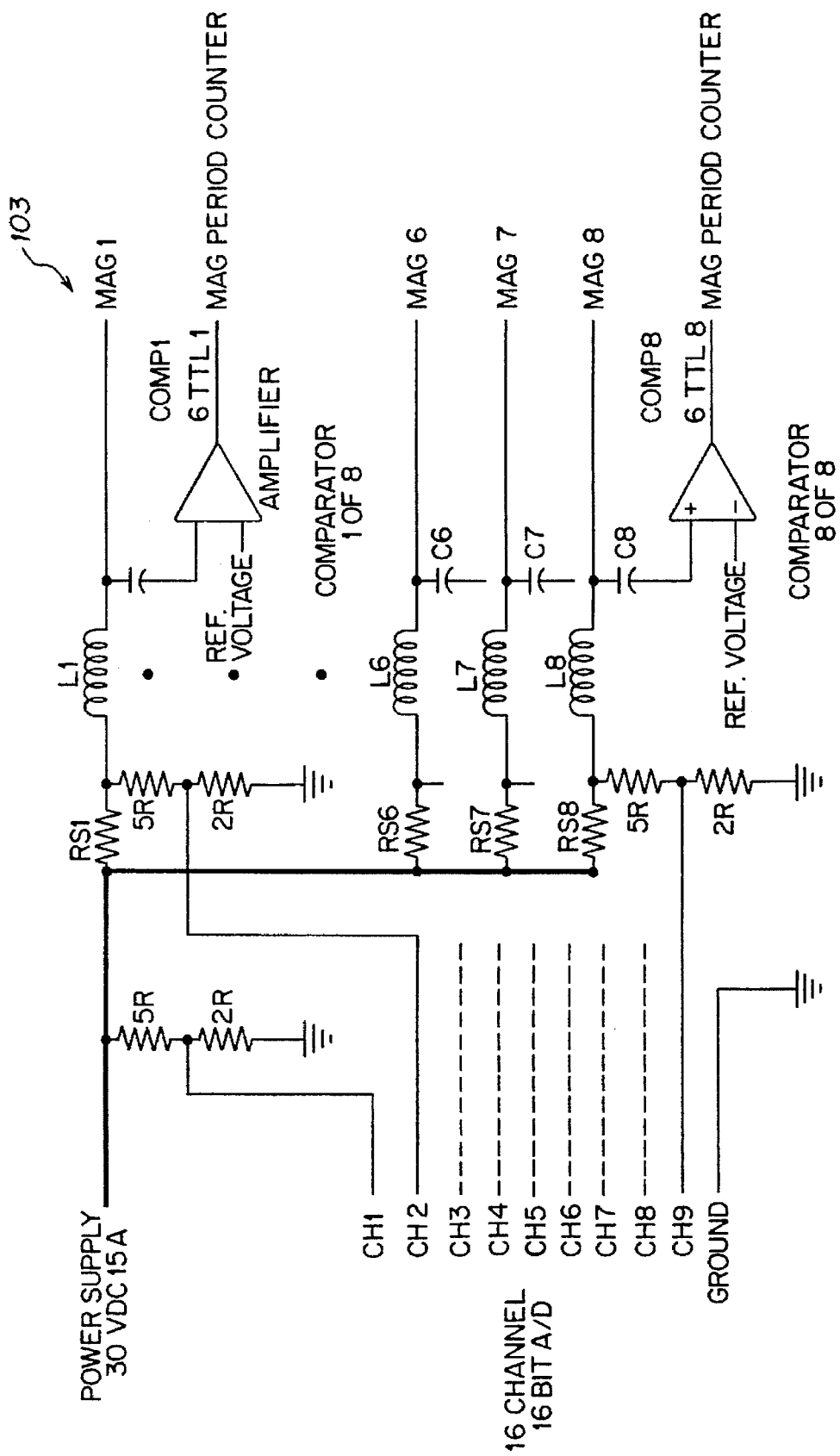
FIG. 22. Block diagram of magnetometer analog interface hardware.

The magnetometer analog board 103 (see FIG. 22) provides several functions including magnetometer power supply voltage and current measurement and converting the Larmor frequency riding on the power supply from a sine wave to a TTL compatible signal for the period counter board 102. The power supply measurements are performed by a 16-channel, 16 bit analog-to-digital (A/D) converter board. The measurements are taken on either side of a current sensing resistor for each magnetometer (RS1 . . .

RS8). These voltages are divided by a precision 2:7 voltage divider to scale the voltage to the +10 voltage range of the A/D board. Each resultant voltage is input to a channel of the A/D board. The voltage measured on the magnetometer side of the resistor is the supply voltage to the magnetometer. The difference between the voltages measured on either side of the sensing resistor divided by the value of the resistor is equivalent to two-sevenths of the current supplied to the magnetometer. The sensor control computer controls the AD conversion and performs all scaling and stores the status data in a file for transfer to the MCC.

The Larmor frequency generated by the magnetometers is superimposed on the supply voltage line. This signal is s sine wave with a frequency from 70 KHz to 332.5 KHz. The signal is detected by inserting an inductor L1 in series with the supply line and AC coupling the voltage developed to a buffer/filter amplifier. The buffer amplifier provides sufficient input impedance and gain to interface to a comparator. The comparator converts the sine wave to a TTL compatible signal. The TTL signal is then buffered and transmitted to the magnetometer period counter board 102. The magnetometer period counter board will perform the measurement of the period of the Larmor frequency and interface to the tow platform PC.

Figure 23:
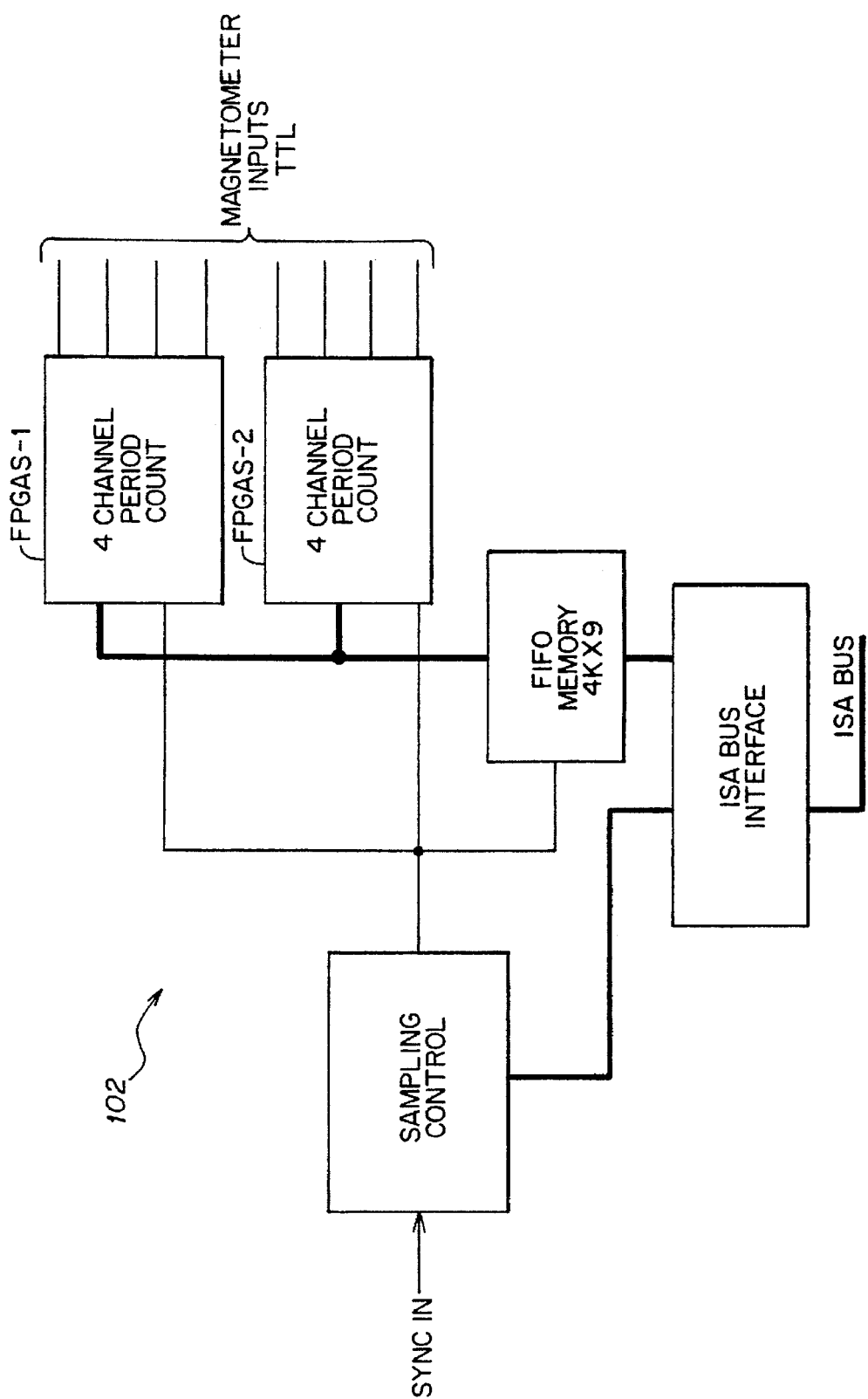
FIG. 23. Block diagram of magnetometer period counter hardware.

The magnetometer period counter board 102, shown in the block diagram of FIG. 23, uses two field programmable gate arrays (FPGAs) in 44-pin packages. Each FPGA will provide the period counters for four magnetometer channels.

If the maximum sampling rate is 20 Hz, then the time limit to determine the period of the Larmor frequency is 50 ms. This time interval has fixed requirements to transfer data to the first in first out (FIFO) memory. The time required for these transfers is in the order of 10's of microseconds. Therefore, the remaining portion of the 50 ms interval can be utilized for period measurement.

All magnetometer measurements have to be synchronized to the navigation (nav) sync pulse. The period measurement hardware will be in wait mode until a sync is received. The sync will reset all counters and start the data taking sequence. Each period counter will consist of three counters. One counter will count transitions (edges) of the Larmor frequency, another counter will count the 10 MHz crystal clock, the third counter will count the number of sample intervals. The first transition of the Larmor frequency will open a gate for the 10 MHz counter. Both counters will continue to count until a predetermined time has elapsed. The gate time will be the sample interval (i.e., 50 ms) minus the data transfer time and the maximum period expected from the Larmor frequency. At the end of the predetermined time a flip flop will be set which will be anded with a transition of the Larmor frequency to terminate the 10 MHz gate. This 10 MHz gate is counted in the third counter to determine how many sample intervals have occurred.

Figure 24:
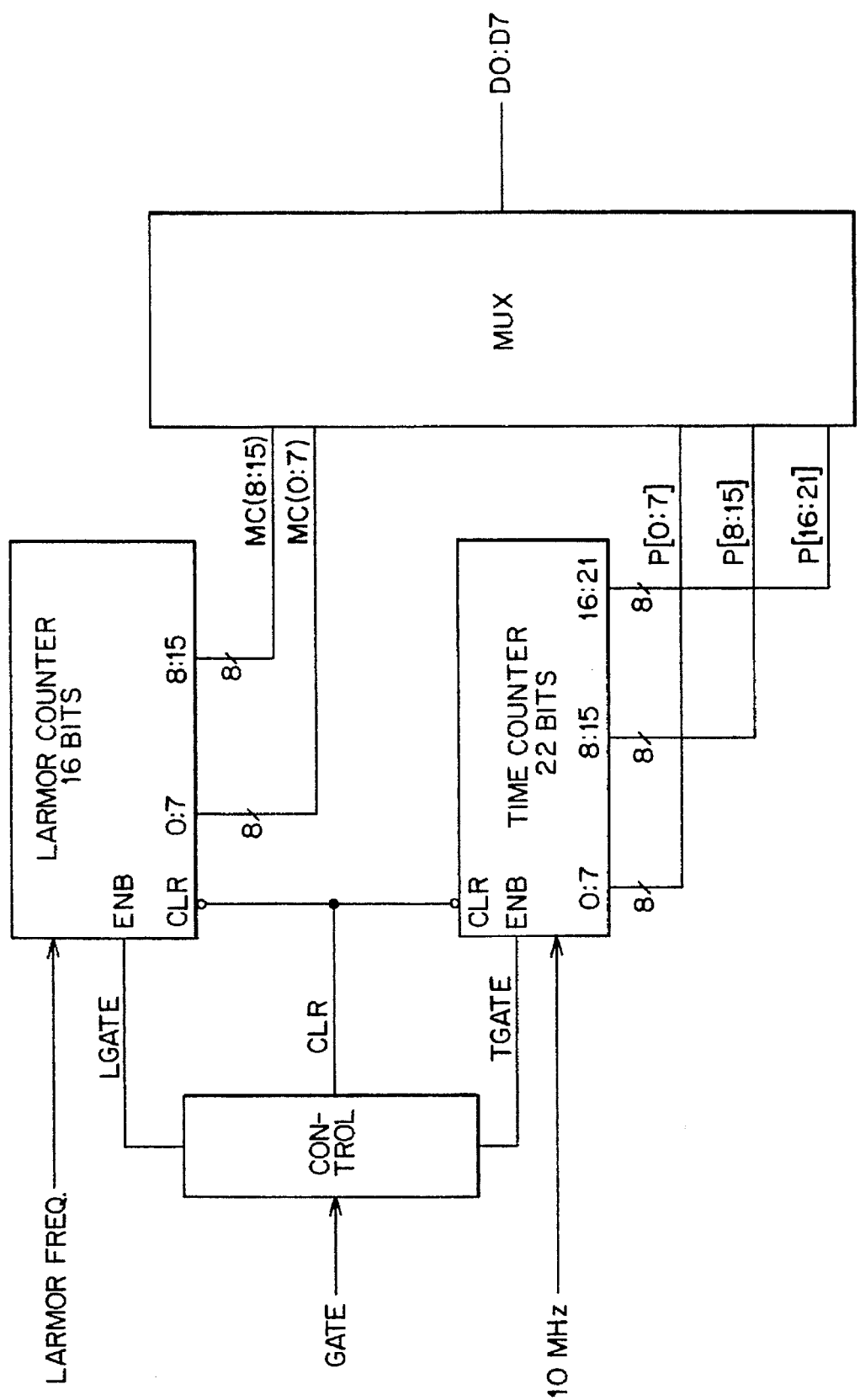
FIG. 24. Schematic circuit diagram showing one channel of four-channel period counter.

Two of the counters per channel (see FIG. 24) will have the information necessary to determine the Larmor frequency. The counter counting Larmor frequency transitions contains the number of periods. The 10 MHz time counter contains the number of 10 MHz periods (100 ns) for the Larmor period count with a 200 ns uncertainty. Dividing the period count number by the product of the 10 MHz count and the 10 MHz period ($10^{-7}$ sec) will yield the Larmor frequency.

The sample intervals are set by program control. Also, the number of sample intervals between sync pulses is loaded under program control. Each sample interval will produce 5 bytes of data for each magnetometer channel. Three bytes will contain the binary value of the 10 MHz counter and two bytes will contain the number of Larmor periods. The data will be double buffered through the FIFO memory. For a 1 sec sync, there will be 8 magnetometer channels times 5 data bytes times the number of samples (for example, 20) which will result in 800 bytes of data to be transferred to the TPI processor 100. The TPI processor will perform the division and multiplication to convert the data bytes to gamma to provide the MCC with a file of gamma values.

The Larmor frequency counters and the 10 MHz counters for four channels are incorporated in an FPGA chip. In order to avoid exceeding the logic available, the Larmor counter has been set at 16 bits and the 10 MHz counter has been set at 22 bits.

The number of bits available limits the sampling window that can be used without exceeding the range of the counter. For the 16 bit Larmor counter the count interval is limited to 0.197 seconds at 95,000 gamma or 332,500 frequency. The 10 MHz counters are limited to 0.419 seconds. The system is limited by these counters to a maximum sampling gate length of less than 0.197 seconds. Note this is the maximum gate length, not the lowest sampling rate.

The precision of the period measurement may be calculated as follows: the Larmor counter counts the member of periods during the counting interval. The time counter counts the number of 100 ns intervals of the 10 MHz clock. The counter precision is two counts, from synchronizing the Larmor frequency.

For a sampling rate of 20 samples per second, assume the count window is 49.8 ms 498,000 counts of the 10 MHz clock to allow for data transfer. The count precision is equal to the gamma precision therefore:

$$\text{precision/gamma} = 2/498{,}000$$

$$\text{precision} = \frac{2\,\text{gamma}}{498{,}000}$$

At 20,000 gammas:

$$\text{precision} = \frac{40{,}000}{498{,}000} = 0.08\text{ gammas}$$

At 80,000 gammas:

$$\text{precision} = \frac{160{,}000}{498{,}000} = 0.32\text{ gammas}$$

At 95,000 gammas:

$$\text{precision} = \frac{190{,}000}{498{,}000} = 0.38\text{ gammas}$$

The programmable counters to determine the sampling interval, the sampling rate, and the number of samples between external syncs, are common to all channels and may use a programmable counter timer chip such as the AMD Am9513A.

The 5 bytes of data per channel will be stored in a FIFO memory after each sample interval. The data array will thus consist of 5 bytes×8 channels×20 samples/sec or 800 bytes per second. A 2K×8 FIFO will hold 2 seconds of data allowing the previous seconds data to be read out any time during the present second. A 4K×8 FIFO will hold 4 seconds of data allowing the same procedure for 2 second syncs. This form of double buffering removes the necessity for tight timing restraints on the software.

7. Portable Magnetometer And Navigational System 7.1 Overview

Figure 26:
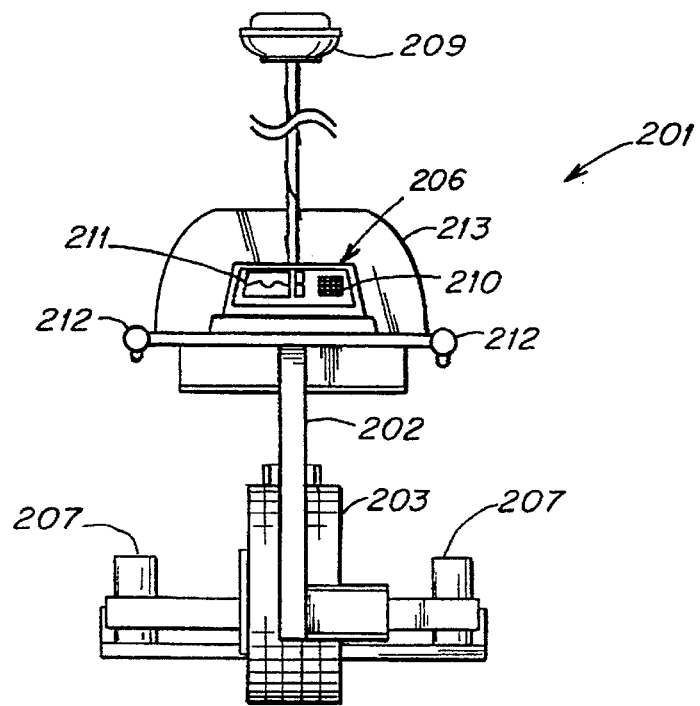
FIG. 26. Rear view of the wheeled assembly of FIG. 25.
Figure 27:
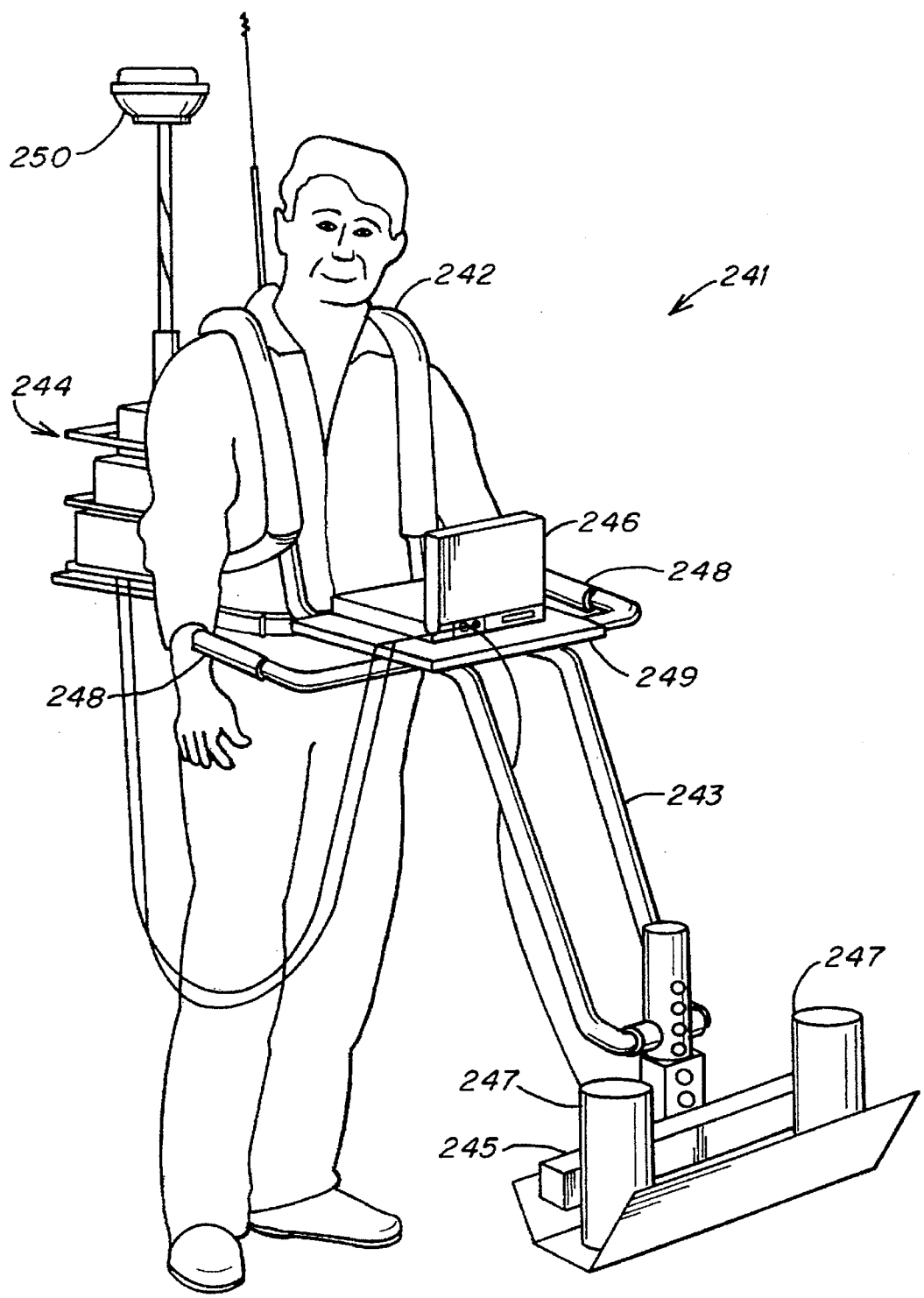
FIG. 27. Front perspective view of an alternative portable harness embodiment of this invention.

The portable system includes a manually-operable sensor platform which is attached to an operator via a wheeled assembly (FIGS. 25–26) or a maneuverable harness (FIG. 27). The portable assembly includes a mobile GPS antenna for receiving GPS navigational data. The assembly may further include a micro-navigation system for preventing erratic operator movement and tracking magnetometer positioning relative to the GPS antenna. For example, micro-navigation sensors may be used to determine the acceleration, velocity, yaw, pitch and roll of the magnetometers. Additionally, a compass may be used to determine the bearing of the magnetometers. The packaging of this equipment includes significant ergonomic and low-magnetic signature requirements.

In the portable embodiment, one or more cesium vapor magnetometers are mounted in a constricted platform which is moved manually. Positioning the magnetometer on or adjacent the operator as a "body extension" allows access to areas currently denied by vehicle-based systems. The operator may advance at an effective rate of up to one mile per hour (mph), which permits coverage of up to ⅓ acre per hour (approximately 2 acres per day), depending upon deployment conditions.

The system will now be more specifically described with respect to the following subsystems.

7.2 Computer Control System

The computer system controls operator input, data acquisition, navigation integration, and system monitoring. The computer acquires navigation data from the navigational subsystem, magnetic data and auxiliary sensor position data from the sensor subsystem, stores all required information on non-volatile media, and provides visual information to the operator in both on-line and off-line mode.

The computer consists of a ruggedized 40386 or 40486 computer, full keypad for operator setup, auxilliary keypad for on-line control, graphical realtime display of operator transverse paths and status indications, and complete connectivity to PCs. The computer can process data from auxilliary positioning sensors and inform the operator via audio and visual feedback of the acceptability of magnetometer positioning.

The system can operate in a data acquisition mode continually for at least four hours in temperatures ranging from 30° to 122° F. The system design permits operation in light rain and moderate dust conditions. Storage capacity accommodates up to four hours of navigational and magnetometer data, but may be expanded.

7.3 Macro-Navigation System

The position of the operator is tracked by a global positioning system (GPS). A GPS antenna is ported by the operator. Position accuracy of the operator ranges between 0.25 to 1.0 meter (m). It is desirable that macro-navigation errors be minimized to the greatest extent possible.

The macro-navigation system provides two functions: first it provides a realtime position of the navigation antenna to the computer. This information is used by the operator to create maps of covered areas. Second, it provides an accurate 1-second minimum sync pulse to the magnetometer interface. This sync pulse is used to ensure accurate data/time syncronization.

7.4 Micro-Navigation System

In order to establish accurate and robust data, the system may be provided with auxilliary sensors to measure the acceleration, velocity, yaw, pitch and roll of the magnetometers. Additionally, a compass is used to determine the bearing of the sensors. Data from these sensors is read into the control computer, analyzed and compared with predefined acceptable position and motion threshold levels. Information is displayed to the operator to indicate that sensor location and movement is acceptable or unacceptable. Based on technological complexity and cost, an alternative to establishing auxiliary sensor micro-navigation would be to limit the motion of the magnetometer through mechanical constriction.

Tracking the position of the sensors relative to the antenna is useful for two reasons: first, the position of the sensors should be known in order to accurately position stamp the magnetometer data. The inherent freedom of motion associated with a man-portable system requires that the relative motion of the sensor be monitored with respect to a known point. Second, information describing the motion and position of the sensors can be presented to the operator to help keep the sensor in a valid position. For example, the sensors should stay within a range of heights from the ground, maintain certain orientation with respect to vertical, and should not be allowed to move in excess of predetermined velocities and accelerations.

7.5 Sensor Platform

The sensor platform contains one and preferably two or more full-field cesium vapor, optically-pumped magnetometers. The platform is attached to the operator via a maneuverable harness or wheel assembly. Additionally, the sensor platform houses the auxilliary sensors to accurately position the magnetometer relative to the navigation antenna.

The system can collect magnetic field data at a rate of about 20 Hz, have a sensitivity of 1 nT and a dynamic range of 20,000 to 95,000 nT. The magnetometers output a variable frequency which is converted directly to gammas via a multi-channel magnetometer interface. The sensor interface communicates directly with the control computer.

Figure 25:
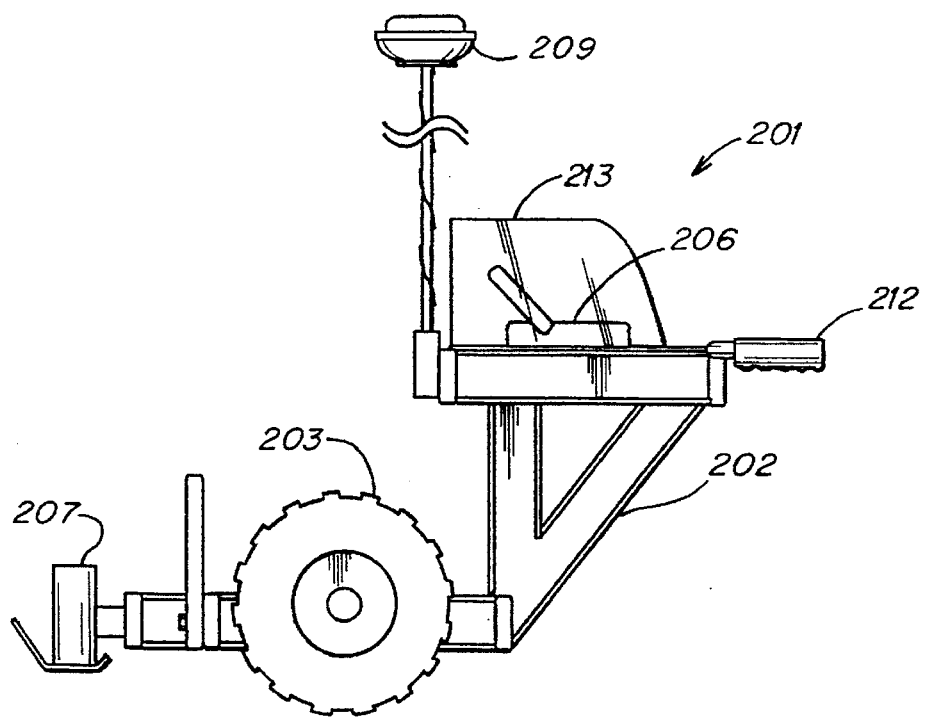
FIG. 25. Side elevational view of one embodiment of the portable surveying system of this invention, comprising a wheeled assembly.

FIGS. 25–26 are side and rear views respectively of one embodiment comprising a wheeled assembly. The assembly 201 is a non-magnetic welded aluminum support frame 202 with a single wheel. A non-magnetic all-terrain off-road tire 203 is provided on the one wheel. A GPS antenna 209 is mounted in the center of the assembly on top of a nonmagnetic support pole. A ruggedized data acquisition computer 206 is mounted at the rear end of the frame 204, adjacent a pair of handles 212 which are engaged by the operator. Two magnetometers 207 spaced 0.5 m apart depend downwardly from the front of the frame in a relatively constrained position. The magnetometers may be mechanically adjustable as to height, e.g., 6, 12 and 18 inches. The computer's input keyboard 210 and display screen 211 are readily visible and accessible to the operator as he or she engages the hand grips 212. A weather shield 213 is provided to protect the computer.

An alternative embodiment 241 is shown in FIG. 27. A harness 242 is mounted on the shoulders of the operator and includes a DC power supply 244 (behind the operator). An upper platform 242 is provided on the front of the harness on which is mounted a computer 246 which is readily accessible to the operator. A pair of support arms 243 extend downwardly from the platform to a lower platform 245 adjacent the ground on which are mounted a pair of magnetometers 247 spaced 0.5 m apart. A pair of handle bars 248 with end grips extend from the upper platform which enable the operator to adjust the positioning of the magnetometers. A GPS antenna 249 is provided adjacent the DC power supply on top of a non-magnetic support pole.

Figure 28:
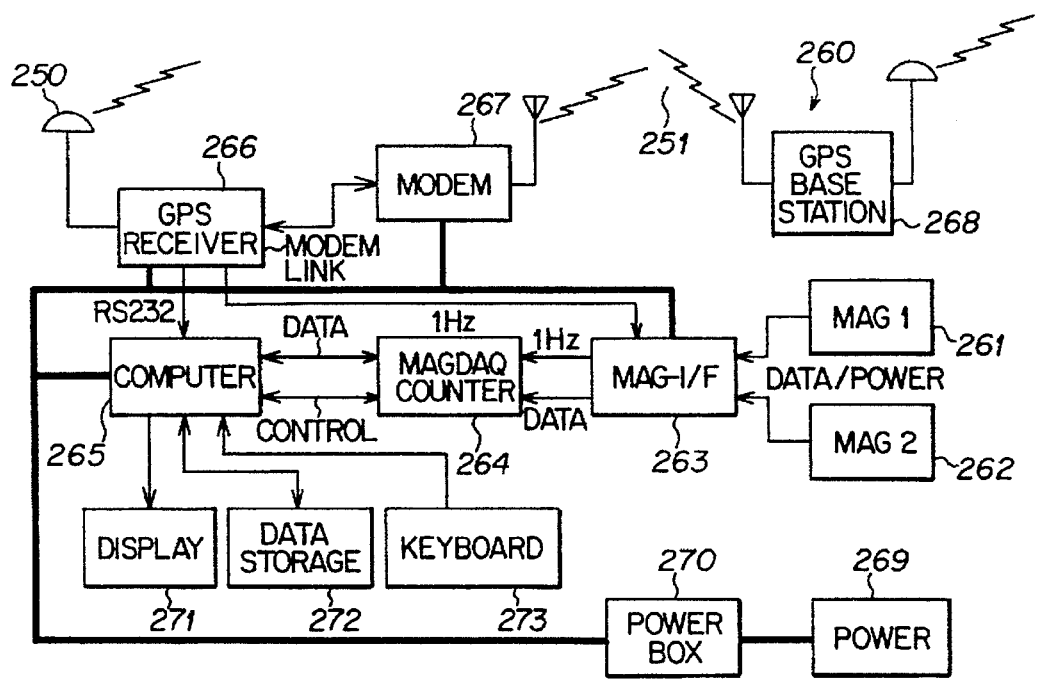
FIG. 28. Block diagram of the portable system of this invention.

FIG. 28 is a block diagram of the portable system 260. A pair of magnetometers 261 and 262 transmit data to interface 263. The interface 263 preprocesses the data and sends the data, along with the 1 Hz sync signal, to a period counter 264. The period counter 264 then sends the data and control information to the central computer 265. A GPS receiver 266 includes a GPS antenna 250 which receives navigational data from a plurality of satellites (not shown) and a modem 267 and RF antenna link 251 to a stationary GPS base station 268. The receiver 266 sends the GPS navigational data and 1 Hz sync signal to the interface 263 and computer 265. The computer 265 includes a display screen 271, data storage 272, and keyboard 273. A power supply 269 provides power via power box 270 to each of the computer 265, interface 263, receiver 266 and modem 267.

The one-Hz synchronization pulse supplied from receiver 266 triggers a frame of 20 samples per second in period counter 264 for sensor data. The navigation data is sampled at a rate of 1 Hz. The computer 265 performs low-level processing of incoming data from counter 264, monitors the system synchronization, and stores the data on the hard disk.

Figure 29:
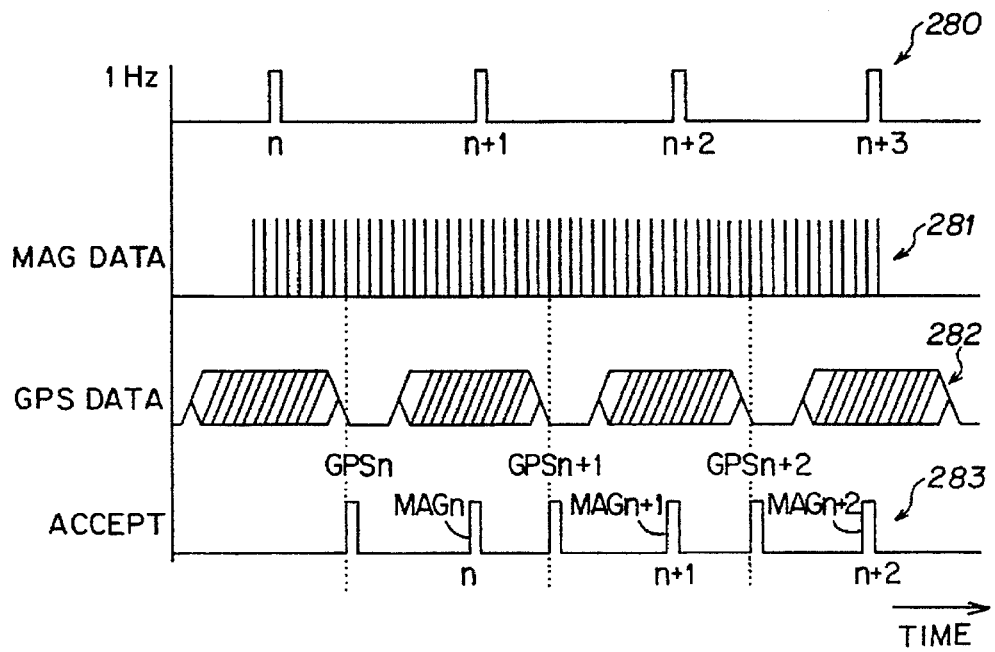
FIG. 29. Timing diagram illustrating the various timing and data signals.

FIG. 29 is a data acquisition timing diagram. The upper signal 280 is the 1 Hz synchronization pulse supplied by the GPS receiver 266. The mag data signal 281 is the magnetometer data, which begins at each sync pulse. The GPS data signal 282 is the envelope of GPS navigational data, over which time navigational data is collected for making the position determination. The accept signal 283 is a combination of the accepted GPS position data ($GPS_n$) and magnetometer data ($Mag_n$) at sample times n, n+1, n+2, etc. As shown, the $Mag_n$ value corresponds with the GPS position value $GPS_n$.

The portable system includes software similar to the vehicle-based system which provides the following functions:

initializes data acquisition hardware acquires sensor and GPS data at every second triggered by GPS clock stores acquired data to hard disk terminates under invalid trigger-signal and/or GPS-data conditions displays operational information and data on the screen under diagnostic mode suspends/resumes saving data upon pressing a key; indicates that data saving is resumed by making a beep sound.

The program provides two modes of operation: survey and diagnostic. Under both modes the program will synchronize the hardware with the 1 Hz GPS clock pulse for about five seconds and then start normal operation. With the survey mode, the portable collects data and saves it on the hard disk. While doing so it beeps every second to indicate to the operator that data is being saved. During surveying, the operator can suspend saving data by hitting a key; the portable still acquires data but does not save it to the hard disk. Under this condition, beeping will stop to indicate that the data is now being stored. The operator can resume saving data by hitting the key again.

Under the diagnostic mode, the system displays a screen similar to that shown in FIG. 30. Each item is updated once a second. The "lat" 301, "lon" 302, "alt" 303 displays show latitude, longitude and altitude information from the GPS. The "GPS time" 304 is the time received from the GPS system. Section 307 includes "initialized" and "interrupt" fields to inform the operator for synchronization of the counter 264 with the 1 Hz clock pulse from the GPS system. The "samples/sec" is the number of sensor values sampled per second and should be 20. The data in the counter 264 must be transferred to the computer 265 within 50 msec. "FIFO Overrun" is incremented when the data available in counter 264 is not being transferred within 3 msec, and hence should always be zero. "One Sec" also tracks that the data is transferred within 50 msec. This value is incremented when the data is transferred into the computer and decremented when there is a 1 Hz interrupt to the counter 264. This value should always be zero.

The "Index" field under "Serial Port" 308 indicates the characters transferred from the GPS to the computer 265 via the serial port. This value can be between 75–85 depending on the checksum bytes in a GGA package, and is usually 79.

The "Program" field 309 indicates the status of the system while it is running. "Elapsed time" indicates the number of seconds since the program started acquiring valid data. "Status" can be running, saving, or pause. The program terminates if the escape key is hit, or if 1 Hz clock or port data is absent. "Error" indicates the reasons for termination. The magnetometer data from sensors 261 and 262 is set forth in display 305 for 19 time segments. The "Data Files" field 306 identifies the name of the data file in which the information will be stored.

Since magnetometer data resembles many other types of scientific data, users of the system of this invention may take advantage of commercially available software for enhanced analysis and printing capabilities. Specifically, output files from the applications software will be readable by several commercial utilities including KBVision by Amerinex Software (a knowledge-based image processing and expert systems package), PV-Wave by Precision Visuals (for visualization and output of contour maps, pseudo-3D surfaces, and images), standard database manipulation programs, and GIS packages (Geographic Information Services, for overlay of survey data on top of photogrametric and standard USGS-type topographic maps). STOLS (Geo-Centers, Inc.) interpretation and mapping routines are applicable to the magnetic surveying and characterization of ordnance, chemical, and nuclear hazardous waste sites.

While there have been shown and described several embodiments of the present invention, it will be obvious to those skilled in the art that various changes and modifications may be made therein without departing from the scope of the invention as defined by the appending claims.

We claim:

1. In a method for detecting at an earth's surface anomalies in an earth's magnetic field caused by buried ferromagnetic objects, an improvement comprising:

providing a plurality of magnetometers in a predetermined array on a mobile platform movable on the earth's surface;

providing a fixed station on the earth's surface;

collecting, on the mobile platform, pseudo range data and range correction data from a global positioning system (GPS) and the fixed station in synchronization with and in a first time period centered around a sync pulse signal provided by the GPS; and traversing the mobile platform over an area on the earth's surface while collecting magnetic field strength data, wherein the collecting of the magnetic field strength data is performed in a second time period initiated upon receipt of the sync pulse signal.

2. The method of claim 1, wherein the first time period is centered around the sync pulse signal, and the second time period begins at the time of receipt of the sync pulse signal and ends before a next first time period.

3. The method of claim 1, further comprising digitizing the pseudo range data, the range correction data and the magnetic field strength data.

4. The method of claim 1, further comprising processing the pseudo range data, the range correction data and the magnetic field strength data to provide a magnetic anomaly image of the area of the earth's surface traversed.

5. The method of claim 1, further comprising providing combined range correction data and pseudo range data, and the magnetic field strength data on a display on the mobile platform to enable an operator to review the same.

6. The method of claim 1, wherein a spacing between the plurality of magnetometers in the predetermined array, a speed of traversal of the mobile platform, and a sampling rate for collecting the magnetic field strength data are selected to provide a desired density of the magnetic field strength data.

7. The method of claim 6, wherein the sampling rate for collecting of magnetic field strength data is at a rate of 20 Hz.

8. The method of claim 7, wherein the spacing between the plurality of magnetometers is substantially 0.5 meters apart from one another.

9. The method of claim 8, wherein the speed of traversal of the mobile platform over the area on the earth's surface is performed at a maximum vehicle velocity of 10 meters per second to ensure that the sampling rate of the magnetic field strength data does not exceed the 0.5 meter spacing between magnetometers.

10. The method of claim 1, wherein the sync signal received from the GPS has a frequency of 1 Hz.

11. An apparatus for detecting at an earth's surface anomalies in an earth's magnetic field caused by buried ferromagnetic objects, an improvement comprising:
a plurality of magnetometers in a predetermined array on a mobile platform movable on the earth's surface;
a fixed station on the earth's surface;
means, disposed on the mobile platform, for collecting pseudo range data and range correction data from a global positioning system (GPS) and the fixed station in synchronization with and in a first time period centered around a sync pulse signal provided by the GPS; and
collecting means for collecting magnetic field strength data while the mobile platform traverses an area on the earth's surface, during a second time period initiated upon receipt of the sync signal to provide synchronized pseudo range data, range correction data and magnetic field strength data.

12. The apparatus of claim 11, wherein the mobile platform includes means for displaying combined range corrected data and pseudo range data, and the magnetic field strength data.

13. The apparatus of claim 11, wherein the mobile platform includes means for digitizing and storing the synchronized pseudo range data, the range correction data and the magnetic field strength data.

14. The apparatus of claim 11, wherein the mobile platform includes:
an antenna for receiving the sync signal from the GPS;
a magnetometer interface with means, responsive to receipt of the sync signal, for serially attaching the plurality of magnetometers to enable collection of the magnetic field strength data upon receipt of the sync signal.

15. The apparatus of claim 11, wherein the mobile platform comprises an all-terrain vehicle and towed platform having a low magnetic signature, and wherein the array of magnetometers is disposed on the towed platform.

16. The apparatus of claim 15, wherein the all-terrain vehicle includes a data acquisition hardware and software system for receiving the synchronized pseudo range data, the range correction data and the magnetic field strength data, and display means for displaying the same.

17. The apparatus of claim 11, further comprising means for compressing the magnetic field strength data when changes in the magnetic field strength data fall below a predetermined limit value.

18. The apparatus of claim 11, wherein the mobile platform comprises a harness which is adapted for wear by a human operator.

19. The apparatus of claim 11, wherein the mobile platform comprises a wheeled assembly movable by a human operator as the human operator walks over the area on the earth's surface.

20. The apparatus of claim 11, further comprising means for determining whether the synchronized pseudo range data, the range correction data and the magnetic field strength data are within predetermined ranges.

21. The apparatus of claim 11, wherein the sync signal received form the GPS has a frequency of 1 Hz.

22. The apparatus of claim 21, wherein the means for collecting the magnetic field strength data is operated at a rate of 20 Hz.

23. The apparatus of claim 22, wherein the plurality of magnetometers are spaced at substantially 0.5 meters apart from one another.

24. The apparatus of claim 23, wherein the mobile platform traverses over the area on the earth's surface at a maximum vehicle velocity of 10 meters per second to ensure that a sample spacing of the magnetic field strength data does not exceed the 0.5 metered spacing between magnetmeters.

25. A method for detecting buried ferromagnetic objects, comprising:
receiving on a mobile system moving on an earth's surface, global positioning system (GPS) range correction data from a fixed reference point on the earth's surface;
receiving GPS pseudo range data on the mobile system moving on the earth's surface;
measuring magnetic field strength data with an array of total field magnetometers on the mobile system while it is moving on the earth's surface, wherein the collection of the magnetic field strength data is synchronized to and in a second time period initiated upon receipt of a sync pulse signal provided by the GPS and the collection of the pseudo range data and the range correction data is in a first time period centered around the sync pulse; and
combining the pseudo range data, the range correction data and the magnetic field strength data in order to determine a location of anomalies in an earth's magnetic field caused by buried ferromagnetic objects.

26. A mobile system for detection of buried ferromagnetic objects, comprising:
an all-terrain vehicle and towed sensor platform including a plurality of magnetometers, a global positioning navigation system, and a data acquisition hardware and software system;
the navigation system including antenna and receiver means, on the towed platform, for receiving range correction data from a stationary global positioning system (GPS) antenna located on an earth's surface, and for receiving pseudo range data from a plurality of GPS satellites;
the magnetometers being disposed in a predetermined array about the antenna and receiver means and a predetermined distance above the earth's surface for detecting magnetic anomalies caused by a presence of buried ferromagnetic objects; and
the data acquisition hardware and software system including means for initiating collection of magnetic field strength data, the range correction data and the pseudo range data, in synchronization with a sync pulse signal provided by the GPS to provide synchronized pseudo range data, range correction data and magnetic field strength data; and means for storing the synchronized pseudo range data, the range correction data and the magnetic field strength data.

27. A portable system for detecting buried ferromagnetic objects comprising a wheeled assembly or a harness assembly worn by an operator including:

a navigation antenna for receiving global positioning system (GPS) range data in synchronization with a synchronization pulse;

a power supply;

a magnetometer for detecting anomalies in an earth's magnetic field caused by buried ferromagnetic objects;

an interface for receiving magnetic field strength data from the magnetometer and the range data from the navigation antenna and for providing digital signals representative thereof;

a computer for receiving the digital signals and processing the same to create synchronized range data and magnetic field strength data; and means for storing the synchronized range data and magnetic field strength data.

28. The system of claim 27, wherein the system further includes sensors for determining acceleration, inclination and height of the magnetometers above an earth's surface.

29. The system of claim 27, wherein the computer includes means for determining whether the synchronized range data and magnetic field strength data are within predetermined ranges.

30. The system of claim 27, further comprising:

a data processing system for processing the stored data and providing one or more of the following outputs:

magnetometer anomaly images of a site;

a missed area map;

a target map; and target reports.

* * * * *